US012776012B2

(12) United States Patent
Su et al.

(10) Patent No.: US 12,776,012 B2
(45) Date of Patent: Oct. 27, 2026

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Bin Su, Shanghai (CN); Yanyan Liu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 848 days.

(21) Appl. No.: 18/156,849

(22) Filed: Jan. 19, 2023

(65) Prior Publication Data

US 2023/0162331 A1 May 25, 2023

Related U.S. Application Data

(63) Continuation of application No. PCT/CN2021/108756, filed on Jul. 27, 2021.

(30) Foreign Application Priority Data

Jul. 28, 2020 (CN) ......................... 202010736829.3

(51) Int. Cl.
*G06T 5/77* (2024.01)
*G09G 5/36* (2006.01)

(52) U.S. Cl.
CPC ................. *G06T 5/77* (2024.01); *G09G 5/36* (2013.01); *G06T 2207/20081* (2013.01); *G09G 2320/0209* (2013.01)

(58) Field of Classification Search
CPC ... G06T 5/77; G06T 2207/20081; G09G 5/36; G09G 2320/0209

(Continued)

(56) References Cited

U.S. PATENT DOCUMENTS

2002/0024017 A1 2/2002 Overdick et al.
2010/0046593 A1* 2/2010 Schenk ............... H04L 12/2861 375/222

(Continued)

FOREIGN PATENT DOCUMENTS

CN 102376097 A 3/2012
CN 107330949 A 11/2017

(Continued)

OTHER PUBLICATIONS

Dijkstra, Klaas, et al. "Hyperspectral demosaicking and crosstalk correction using deep learning: K. Dijkstra et al." Machine Vision and Applications 30.1 (2019): 1-21. (Year: 2019).*

(Continued)

*Primary Examiner* — Jonathan S Lee
(74) *Attorney, Agent, or Firm* — METIS IP LLC

(57) ABSTRACT

A method for image processing may be provided. The method may include obtaining imaging data of an original image and a correction coefficient matrix of the array dimension. The imaging data may have elements arranged in an array of an array dimension. The imaging data may include an artifact caused by inter-element crosstalk. The correction coefficient matrix may be of the array dimension and is determined based on a trained artifact correction model. The method may also include determining processed image data based on the correction coefficient matrix and the imaging data. The method may further include determining an artifact corrected image of the original image based on the processed image data.

16 Claims, 16 Drawing Sheets

1500

(58) Field of Classification Search
USPC .......................................................... 382/275
See application file for complete search history.

(56) References Cited

U.S. PATENT DOCUMENTS

| | | | |
|---|---|---|---|
| 2017/0372193 A1 | 12/2017 | Mailhe et al. | |
| 2019/0005686 A1* | 1/2019 | Liu ........................ | G16H 40/63 |
| 2019/0147588 A1 | 5/2019 | Rowley Grant et al. | |
| 2020/0334871 A1 | 10/2020 | Su et al. | |
| 2021/0256700 A1* | 8/2021 | Senouf ................. | A61B 8/4461 |

FOREIGN PATENT DOCUMENTS

| | | |
|---|---|---|
| CN | 107945132 A | 4/2018 |
| CN | 108109185 A | 6/2018 |
| CN | 110473269 A | 11/2019 |
| CN | 111080740 A | 4/2020 |
| CN | 111223066 A | 6/2020 |
| CN | 111325675 A | 6/2020 |

OTHER PUBLICATIONS

K. Dijkstra et al., Hyperspectral demosaicking and crosstalk correction using deep learning, Machine Vision and Applicatons, 1-21, 2019.
Sung, Minsung et al., Crosstalk Removal in Forward Scan Sonar Image Using Deep Learning for Object Detection, IEE Sensors Journal, 19(21): 9929-9944, 2019.
G. El Fakhri et al., A New Correction Method for Cross-Talk using Artificial Neural Networks: Validation in Simultaneous Technetium and Iodine Cerebral Imaging, IEEE Nuclear Science Symposium, 1000-1004, 2000.
The Extended European Search Report in European Application No. 21849918.4 mailed on Nov. 30, 2023, 8 pages.
International Search Report in PCT/CN2021/108756 mailed on Sep. 28, 2021, 4 pages.
Written Opinion in PCT/CN2021/108756 mailed on Sep. 28, 2021, 5 pages.

* cited by examiner

500

1000

1300

1400

SYSTEMS AND METHODS FOR IMAGE PROCESSING

CROSS-REFERENCE TO RELATED APPLICATIONS

This application is a Continuation of International Application No. PCT/CN2021/108756, filed on Jul. 27, 2021, which claims priority to Chinese Patent Application No. 202010736829.3, filed on Jul. 28, 2020, the contents of which are hereby incorporated by reference.

TECHNICAL FIELD

The present disclosure generally relates to image processing, and more particularly, methods and systems for correcting artifacts caused by inter-element crosstalk.

BACKGROUND

Artifacts caused by inter-element (e.g., inter-detector unit, inter-pixel, inter-voxel) crosstalk often exist in images captured from detectors having a detector unit array (e.g., a pixel array, a voxel array) structure. Existing approaches for correcting artifacts caused by inter-element crosstalk include installing an anti-crosstalk apparatus on an imaging detector or applying a smoothing algorithm on an image (or imaging data) acquired by the imaging detector, which are expensive and/or lack accuracy. The existing approaches may be applicable only to a certain imaging detector. For instance, an anti-crosstalk apparatus installed on one imaging device may correct inter-element crosstalk artefacts of that imaging device. Therefore, it is desirable to provide systems and methods for correcting artifacts caused by inter-element crosstalk with improved accuracy and/or broader applicability.

SUMMARY

According to an aspect of the present disclosure, a system for image processing may be provided. The system may include at least one storage device and at least one processor configured to communicate with the at least one storage device. The at least one storage device may include a set of instructions. When the at least one storage device execute the set of instructions, the at least one processor may be directed to cause the system to perform one or more of the following operations. The system may obtain imaging data, wherein the imaging data includes an artifact caused by inter-element crosstalk. The system may also determine an artifact corrected image based on a trained artifact correction model and the imaging data.

In some embodiments, the imaging data may be raw image data. The imaging data may have elements arranged in an array of an array dimension. The trained artifact correction model may be associated with the array dimension of the array.

In some embodiments, to determine the artifact corrected image based on the trained artifact correction model and the imaging data, the system may determine processed image data based on the trained artifact correction model and the raw image data. The system may also determine the artifact corrected image by image reconstruction using the processed image data.

In some embodiments, to determine the processed image data based on the trained artifact correction model and the raw image data, the system may obtain the processed image data by inputting the raw image data into the trained artifact correction model.

In some embodiments, to determine the processed image data based on the trained artifact correction model and the raw image data, the system may determine a correction coefficient matrix based on the trained artifact correction model. The system may further determine the processed image data based on the correction coefficient matrix and the raw image data.

In some embodiments, the imaging data may be an original image. To determine the artifact corrected image of the original image based on the trained artifact correction model and the imaging data, the system may obtain the artifact corrected image by inputting the original image into the trained artifact correction model.

In some embodiments, to generate the trained artifact correction model, the system may obtain a plurality of sample sets, wherein each sample set includes sample imaging data and reference sample imaging data. The system may further obtain the trained artifact correction model by training a preliminary artifact correction model based on the plurality of sample sets.

In some embodiments, for each sample set, the sample imaging data may include sample elements arranged in a sample array of a sample array dimension. The reference sample imaging data may include reference sample elements arranged in a reference sample array of a reference sample array dimension. The sample array dimension and the reference sample array dimension may equal the array dimension of the original image.

In some embodiments, the sample imaging data or the reference sample imaging data may be acquired by a sample imaging device. The sample imaging device may include a sample detector. The sample detector may include a sample detector unit array of the array dimension.

In some embodiments, the sample detector unit array may be configured as a plurality of sample detector modules.

In some embodiments, to obtain the plurality of sample sets, the system may perform one or more of the following operations. For a sample set of the plurality of sample sets, the system may obtain the reference sample imaging data. The system may further determine the sample imaging data by adding a simulated sample crosstalk artifact to the reference sample imaging data.

In some embodiments, to determine the sample imaging data by adding the simulated sample crosstalk artifact to the reference sample imaging data, the system may identify a plurality of reference elements from the reference sample imaging data. For each of the plurality of reference elements with respect to a corresponding sample element, the system may determine a crosstalk coefficient representing a degree of crosstalk between the corresponding sample element and at least one neighboring sample element. The system may further determine the sample imaging data based on the crosstalk coefficient of each of the plurality of reference elements and the reference sample imaging data.

In some embodiments, for each of the plurality of reference elements with respect to a corresponding sample element, to determine the crosstalk coefficient representing the degree of crosstalk between the corresponding sample element and at least one neighboring sample element, the system may perform one or more of the following operations. For each reference element in a first element group of the plurality of reference elements, the system may assign a first coefficient value. For each reference element in a second element group of the plurality of reference elements, the system may assign a second coefficient value that is different from the first coefficient value.

In some embodiments, each reference element in the first element group may correspond to a first sample detector unit that is located in an inner region of one of the plurality of sample detector modules. Each reference element in the second element group may correspond to a second sample detector unit that is located in a border region of one of the plurality of sample detector modules.

In some embodiments, for each of the plurality of reference elements with respect to a sample element, to determine the crosstalk coefficient representing the degree of crosstalk between the corresponding sample element and at least one neighboring sample element, the system may assign a third coefficient value for each of the plurality of reference elements.

In some embodiments, for each of the plurality of reference elements with respect to a sample element, to determine the crosstalk coefficient representing the degree of crosstalk between the corresponding sample element and at least one neighboring sample element, the system may assign a random coefficient value for each of the plurality of reference elements. The random coefficient value may be within a range defined by a first coefficient threshold and a second coefficient threshold.

In some embodiments, to obtain the plurality of sample sets, the system may perform one or more of the following operations. For a sample set of the plurality of sample sets, the system may obtain reference sample imaging data from a sample imaging device installed with an anti-crosstalk apparatus. The system may further obtain sample imaging data having a sample crosstalk artifact from the sample imaging device.

In some embodiments, to obtain the plurality of sample sets, the system may perform one or more of the following operations. For a sample set of the plurality of sample sets, the system may obtain sample imaging data having a sample crosstalk artifact. The system may further determine reference sample imaging data by removing the sample crosstalk artifact from the sample imaging data according to a predetermined algorithm.

According to another aspect of the present disclosure, a system for image processing may be provided. The system may include at least one storage device and at least one processor configured to communicate with the at least one storage device. The at least one storage device may include a set of instructions. When the at least one storage device execute the set of instructions, the at least one processor may be directed to cause the system to perform one or more of the following operations. The system may obtain imaging data of an original image and a correction coefficient matrix of the array dimension. The imaging data may have elements arranged in an array of an array dimension. The imaging data may include an artifact caused by inter-element crosstalk. The correction coefficient matrix may be of the array dimension and is determined based on a trained artifact correction model. The system may also determine processed image data based on the correction coefficient matrix and the imaging data. The system may further determine an artifact corrected image of the original image based on the processed image data.

According to yet another aspect of the present disclosure, a method for image processing may be provided. The method may include obtaining imaging data. The imaging data may include an artifact caused by inter-element crosstalk. The method may further include determining an artifact corrected image based on a trained artifact correction model and the imaging data.

According to yet another aspect of the present disclosure, a method for image processing may be provided. The method may include obtaining imaging data of an original image and a correction coefficient matrix of the array dimension. The imaging data may have elements arranged in an array of an array dimension. The imaging data may include an artifact caused by inter-element crosstalk. The correction coefficient matrix may be of the array dimension and is determined based on a trained artifact correction model. The method may also include determining processed image data based on the correction coefficient matrix and the imaging data. The method may further include determining an artifact corrected image of the original image based on the processed image data.

According to yet another aspect of the present disclosure, a system for image processing may be provided. The system may include an acquisition module and a determination module. The acquisition module may be configured to obtain imaging data. The imaging data may include an artifact caused by inter-element crosstalk. The determination module may be configured to determine an artifact corrected image based on a trained artifact correction model and the imaging data.

According to yet another aspect of the present disclosure, a system for image processing may be provided. The system may include an acquisition module and a determination module. The acquisition module may be configured to obtain imaging data of an original image and a correction coefficient matrix of the array dimension. The imaging data may have elements arranged in an array of an array dimension. The imaging data may include an artifact caused by inter-element crosstalk. The correction coefficient matrix may be of the array dimension and is determined based on a trained artifact correction model. The determination module may be configured to determine processed image data based on the correction coefficient matrix and the imaging data and an artifact corrected image of the original image based on the processed image data.

According to yet another aspect of the present disclosure, a non-transitory computer readable medium may be provided. The non-transitory computer readable may include at least one set of instructions for image processing. When executed by at least one processor of a computing device, the at least one set of instructions may cause the computing device to perform a method. The method may include obtaining imaging data. The imaging data may include an artifact caused by inter-element crosstalk. The method may further include determining an artifact corrected image based on a trained artifact correction model and the imaging data.

According to yet another aspect of the present disclosure, a non-transitory computer readable medium may be provided. The non-transitory computer readable may include at least one set of instructions for image processing. When executed by at least one processor of a computing device, the at least one set of instructions may cause the computing device to perform a method. The method may include obtaining imaging data of an original image and a correction coefficient matrix of the array dimension. The imaging data may have elements arranged in an array of an array dimension. The imaging data may include an artifact caused by inter-element crosstalk. The correction coefficient matrix may be of the array dimension and is determined based on a trained artifact correction model. The method may also include determining processed image data based on the correction coefficient matrix and the imaging data. The method may further include determining an artifact corrected image of the original image based on the processed image data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, and/or components, but do not preclude the presence or addition of one or more other features, integers, steps, operations, components, and/or groups thereof.

It will be understood that the term "system," "engine," "unit," "module," and/or "block" used herein are one method to distinguish different components, parts, sections or assembly of different levels in ascending order. However, the terms may be displaced by another expression if they achieve the same purpose.

Figure 2:
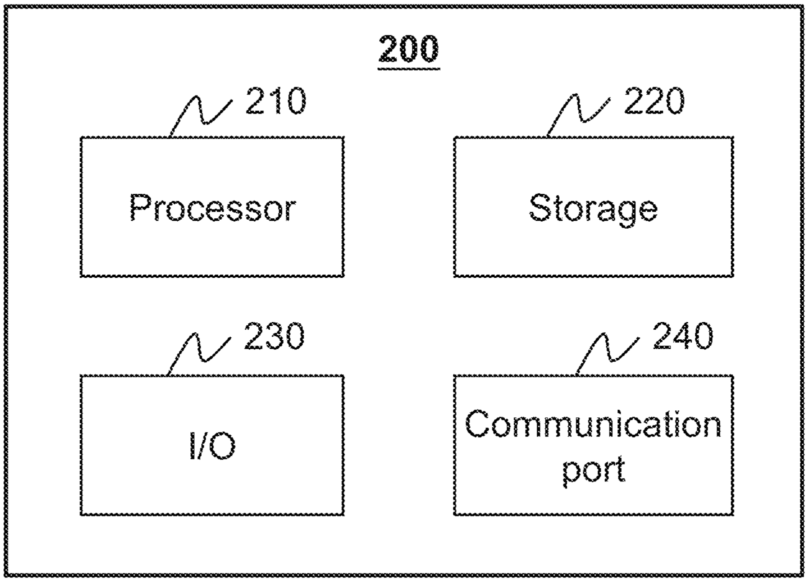
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image.

These and other features, and characteristics of the present disclosure, as well as the methods of operation and functions of the related components of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The term "imaging modality" or "modality" as used herein broadly refers to an imaging method or technology that gathers, generates, processes, and/or analyzes imaging information of a subject. The subject may include a biological subject and/or a non-biological subject. The biological subject may be a human being, an animal, a plant, or a portion thereof (e.g., a heart, a breast, etc.). In some embodiments, the subject may be a man-made composition of organic and/or inorganic matters that are with or without life.

An aspect of the present disclosure relates to systems and methods for correcting an artifact caused by inter-element crosstalk in imaging data acquired by a detector that includes an array of detector units. In the present disclosure, imaging data and image data are used interchangeably. The systems may obtain imaging data or an original image generated by image reconstruction based on the imaging data. The imaging data may have elements arranged in an array of an array dimension, and the imaging data may include an artifact caused by inter-element crosstalk. In some embodiments, an element in raw image data may be a value detected by a detector unit of the array of detector units. Correspondingly, an element in an image of a subject with respect to the raw image data may be a value (e.g., a pixel value, a voxel value, a gray value, a pixel intensity, a voxel intensity etc.) of a pixel or a voxel at a position corresponding to a physical point of the subject. As used herein, the term "inter-element crosstalk" refers to crosstalk between detector units, or its effect on element values (e.g., pixel value, voxel value) of raw image data or on a corresponding image generated based on the raw image data. The systems may further determine an artifact corrected image based on a trained artifact correction model and the imaging data. The trained artifact correction model may be associated with the array dimension of the array. In some embodiments, the imaging data may be raw image data acquired by an imaging device that includes a detector. Processed image data may be obtained by inputting the raw imaging data into the trained artifact correction model, and the artifact corrected image may be determined by image reconstruction performed based on the processed image data. In some embodiments, the artifact corrected image may be obtained by inputting the original image into the trained artifact correction model. In some embodiments, a correction coefficient matrix may be obtained from the trained artifact correction model and stored in a storage device. The imaging data may be pre-processed using the correction coefficient matrix to generate the processed image data on the basis of which the artifact corrected image is determined.

Since the trained artifact correction model is trained by sample sets including sample elements arranged in an array of a same array dimension as that of the original image or the imaging data, either the trained artifact correction model or the correction coefficient matrix may be used to correct the artifact caused by inter-element crosstalk in different imaging systems whose detectors each have a detector unit array of a same array dimension. Further, since image data of an image with crosstalk artifacts is linear with image data of an image (that is deemed) without crosstalk artifacts, a model training process using sample image data (e.g., sample sets in the data domain) may be simple. Moreover, a trained artifact correction model that is trained using the sample image data may be accurate for processing new imaging data.

For illustration purposes, systems and methods for correcting artifacts in an image acquired by a medical imaging device are described hereinafter. It should be noted that this is not intended to be limiting, and systems and methods according to some embodiments of the present disclosure may be applied to correct artifacts caused by inter-element crosstalk in images acquired by any other imaging device having a detector that includes a detector unit array, such as an imaging device for target detection, an imaging device for topographic mapping, etc.

Figure 1:
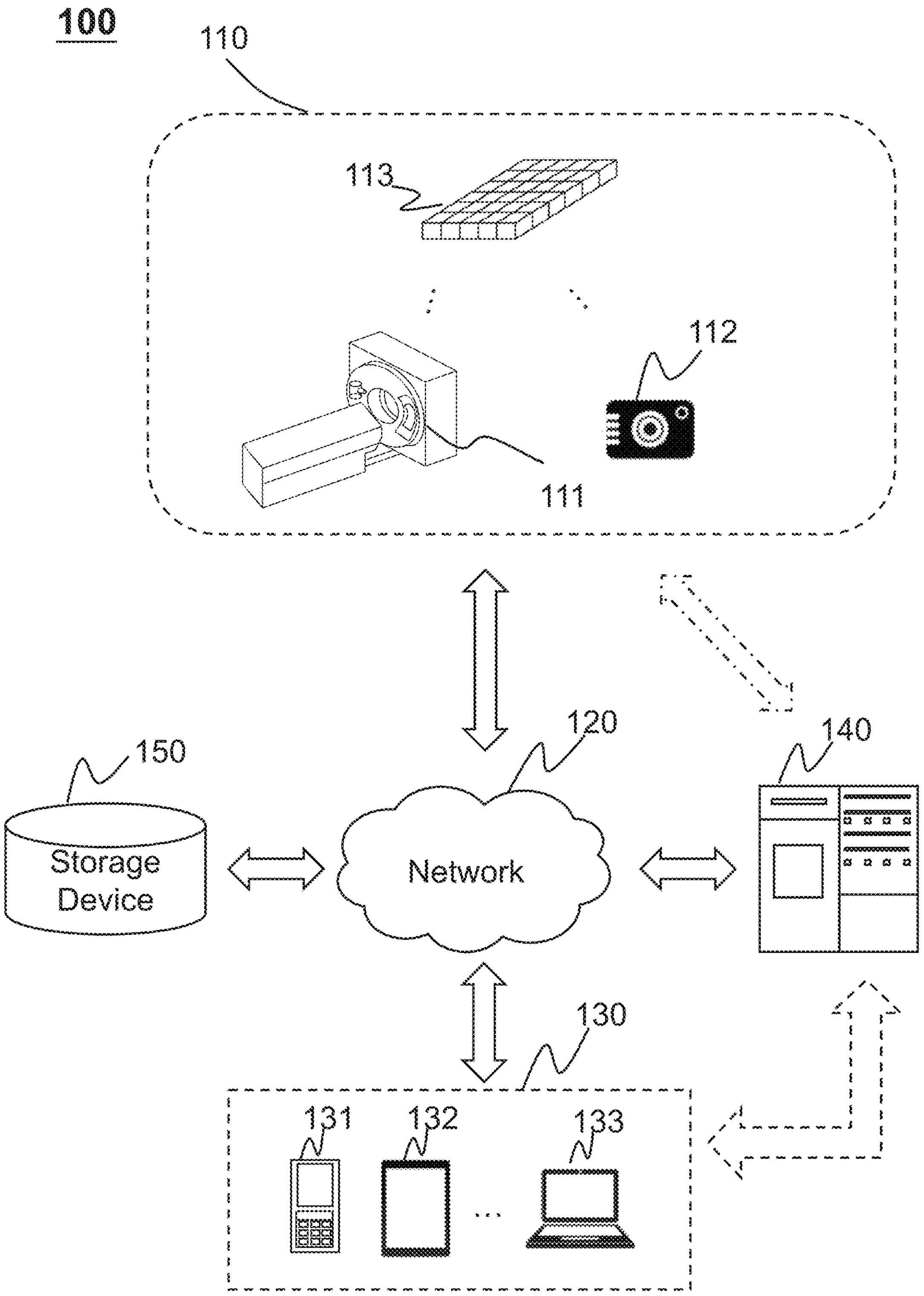
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include an imaging device 110, a network 120, one or more terminals 130, a processing device 140, and a storage device 150. In some embodiments, the imaging device 110, the terminal(s) 130, the processing device 140, and/or the storage device 150 may be connected to and/or communicate with each other via a wireless connection (e.g., the network 120), a wired connection, or a combination thereof. The connection between the components of the imaging system 100 may be variable. Merely by way of example, the imaging device 110 may be connected to the processing device 140 through the network 120, as illustrated in FIG. 1. As another example, the imaging device 110 may be connected to the processing device 140 directly or through the network 120. As a further example, the storage device 150 may be connected to the processing device 140 through the network 120 or directly.

The imaging device 110 may generate or provide imaging data related to a subject. The imaging data of the subject may include an image, projection data (e.g., raw image data), or the like, or a combination thereof. In some embodiments, the imaging data may be two-dimensional (2D) image data, three-dimensional (3D) image data, four-dimensional (4D) image data (e.g., a series of 3D image data over time), or the like, or any combination thereof. In some embodiments, the subject may include a biological subject and/or a non-biological subject. For example, the subject may include a specific portion of a body, such as a heart, a breast, or the like. In some embodiments, the imaging device 110 may include a medical imaging device 111, a camera 112, etc. In some embodiments, the medical imaging device 111 may include a single-modality scanner (e.g., an MRI device, a CT scanner, an X-ray device) and/or multi-modality scanner (e.g., a PET-MRI scanner).

In some embodiments, the imaging device 110 (e.g., the medical imaging device 111, the camera 112) may include a detector 113. The detector 113 may include a detector unit array of an array dimension. For example, the detector unit array may include a plurality of detector units arranged in one or more rows and/or one or more channels (or referred to as columns). The detector unit array may have any suitable shape. For example, the detector unit array may have a shape of an arc, a circle, a rectangle, or the like, or a combination thereof.

A detector unit may refer to a minimum individual component in the detector that may detect a signal. For example, a detector unit may include a scintillator layer and a photodiode. The scintillator layer may absorb radiation beams and emit visible light. The photodiode may detect the emitted visible light. The photodiode may convert the visible light into an electrical signal. In some embodiments, the detected radiation beams may be directly converted into an electrical signal by a suitable material, such as amorphous selenium. An analog/digital converter in the imaging device 110 may convert the electrical signal into digital signal(s) (also referred to as image data, e.g., projection data). In some embodiments, the arrangement of the detector unit array in the detector 113 may correspond to the arrangement of the elements in the imaging data obtained from the detector 113. For example, the detector 113 includes m×n detector units arranged in a detector unit array of m rows and n columns (i.e., an array dimension of m×n); accordingly, the imaging data obtained from the detector 113 includes m×n elements also arranged in an element array of the same array dimension of m×n, in which each of m and n is an integer equal to or greater than 1, respectively. An element of the imaging data at position (p, q) of the element array may correspond to (e.g., acquired by) a detector unit at the same position (p, q) of the detector unit array, in which p is an integer and $1 \le p \le m$, and q is an integer and $1 \le q \le n$.

The network 120 may include any suitable network that can facilitate the exchange of information and/or data for the imaging system 100. In some embodiments, one or more components of the imaging system 100 (e.g., the imaging device 110, the processing device 140, the storage device 150, the terminal(s) 130) may communicate information and/or data with one or more other components of the imaging system 100 via the network 120. For example, the processing device 140 may obtain image data from the imaging device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the imaging device 110, the processing device 140, and/or the storage device 150. For example, the terminal(s) 130 may receive a user instruction to generate an artifact corrected image of an original image of a subject. As another example, the terminal(s) 130 may display the original image and/or the artifact corrected image generated by the processing device 140. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the imaging device 110, the storage device 150, the terminal(s) 130, or other components of the imaging system 100. In some embodiments, the processing device 140 may be a single server or a server group. The server group may be centralized or distributed. For example, the processing device 140 may generate one or more trained artifact correction models that can be used in image processing. As another example, the processing device 140 may apply the trained artifact correction model(s) in image processing. In some embodiments, the trained artifact correction model(s) may be generated by a processing device, while the application of the trained artifact correction model(s) may be performed on a different processing device. In some embodiments, the trained artifact correction model(s) may be generated by a processing device of a system different from the imaging system 100 or a server different from the processing device 140 on which the application of the model(s) is performed. For instance, the trained artifact correction model(s) may be generated by a first system of a vendor who provides and/or maintains such trained artifact correction model(s), while the image processing may be performed on a second system of a client of the vendor. In some embodiments, the application of the trained artifact correction model(s) may be performed online in response to a request for image processing. In some embodiments, the trained artifact correction model(s) may be generated offline.

In some embodiments, the trained artifact correction model(s) may be generated and/or updated (or maintained) by, e.g., the manufacturer of the imaging device 110 or a vendor. For instance, the manufacturer or the vendor may load the trained artifact correction model(s) into the imaging system 100 or a portion thereof (e.g., the processing device 140) before or during the installation of the imaging device 110 and/or the processing device 140, and maintain or update the trained artifact correction model(s) from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new model(s)) or a portion of a model that substitutes or supplements a corresponding portion of the trained artifact correction model(s).

In some embodiments, the processing device 140 may be local to or remote from the imaging system 100. For example, the processing device 140 may access information and/or data from the imaging device 110, the storage device 150, and/or the terminal(s) 130 via the network 120. As another example, the processing device 140 may be directly connected to the imaging device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the imaging device 110. For example, the storage device 150 may store image data collected by the imaging device 110. As another example, the storage device 150 may store a trained artifact correction model and/or a correction coefficient matrix. As still another example, the storage device 150 may store an artifact corrected image of an original image generated by the processing device 140. In some embodiments, the storage device 150 may store data and/or instructions that the processing device 140 may execute or use to perform exemplary methods described in the present disclosure. For example, the storage device 150 may store data and/or instructions that the processing device 140 may execute or use for correcting artifacts.

In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal(s) 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240. In some embodiments, the computing device 200 may further include a system bus. The processor 210, the storage device 220, the input/output (I/O) 230, and/or the communication port 240 may communicate with each other via the system bus.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the imaging device 110, the terminal(s) 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the imaging device 110, the terminal(s) 130, the storage device 150, and/or any other component of the imaging system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure. For example, the storage device 220 may include a non-transitory computer-readable medium (not shown) on which an operating system and computer programs are stored. As another example, the storage device 220 may include a memory.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the imaging device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
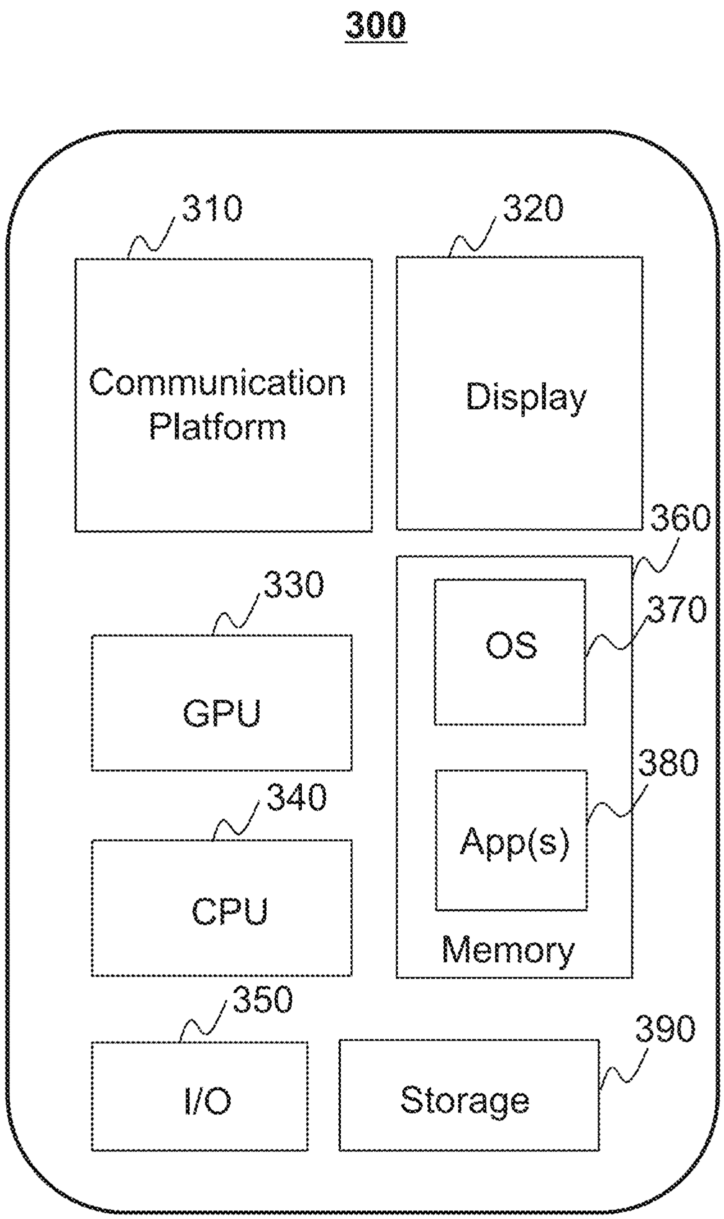
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the components described herein. A computer with user interface components may be used to implement a personal computer (PC) or any other type of work station or terminal device. A computer may also act as a server if appropriately programmed.

Figure 4A:
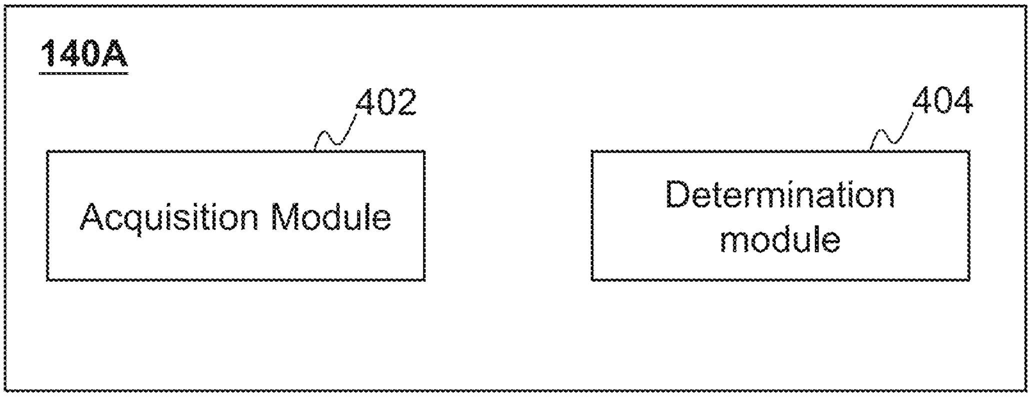
FIG. 4A is a block diagram illustrating an exemplary processing device according to some embodiments of the present disclosure.
Figure 4B:
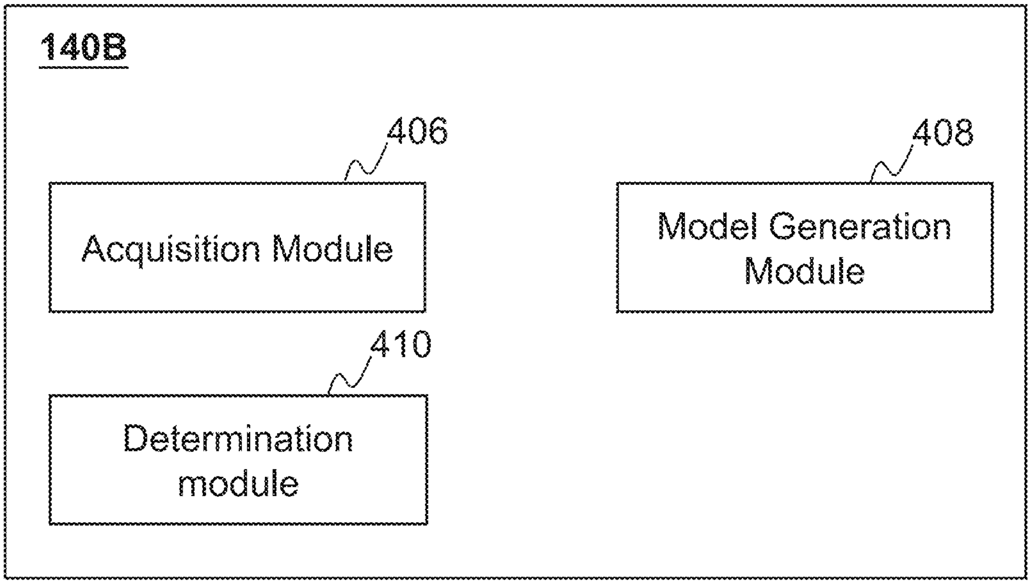
FIG. 4B is a block diagram illustrating an exemplary processing device according to some embodiments of the present disclosure.

FIGS. 4A and 4B are block diagrams illustrating exemplary processing devices 140A and 140B according to some embodiments of the present disclosure.

The processing devices 140A and 140B may be exemplary processing devices 140 as described in connection with FIG. 1. In some embodiments, the processing device 140A may be configured to apply one or more machine learning models in generating an artifact corrected image of an original image. The processing device 140B may be configured to generate the one or more machine learning models. In some embodiments, the processing devices 140A and 140B may be respectively implemented on a processing unit (e.g., a processor 210 illustrated in FIG. 2 or a CPU 340 as illustrated in FIG. 3). Merely by way of example, the processing device 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an acquisition module 402 and a determination module 404.

The acquisition module 402 may be configured to obtain information relating to the imaging system 100. For example, the acquisition module 402 may obtain imaging data. The imaging data may be acquired by the medical imaging device 111 that includes the detector 113. In some embodiments, the imaging data may include elements arranged in an array of an array dimension. In some embodiments, the array dimension of the array of the elements may equal the array dimension of the detector unit array of the detector 113 that acquires the imaging data. In some embodiments, the imaging data may include an artifact caused by inter-element crosstalk (also referred to as a crosstalk artifact). In some embodiments, the imaging data may include an image (e.g., an original image, a processed image of the original image), projection data (e.g., raw image data), or the like, or a combination thereof. In some embodiments, the imaging data may be obtained from an imaging device (e.g., the imaging device 110, the detector 113). More descriptions regarding the obtaining of the imaging data may be found elsewhere in the present disclosure. See, e.g., operation 502 in FIG. 5, and relevant descriptions thereof.

The determination module 404 may be configured to determine an artifact corrected image based on a trained artifact correction model and the imaging data. In some embodiments, the trained artifact correction model may be a process or an algorithm for correcting the crosstalk artifacts in the original image. In some embodiments, the trained artifact correction model may be associated with the array dimension of the array. In some embodiments, the processing device 140A may determine processed image data based on the trained artifact correction model and the raw image data directly. In some embodiments, the determination module 404 may determine processed image data based on a correction coefficient matrix and the imaging data. The correction coefficient matrix may include correction coefficients arranged in a matrix of the same array dimension of the imaging data. In some embodiments, the determination module 404 may determine an artifact corrected image based on the processed image data. More descriptions regarding the determining of an artifact corrected image may be found elsewhere in the present disclosure. See, e.g., operation 504 in FIG. 5, operations 1506 and 1508 in FIG. 15, and relevant descriptions thereof.

As shown in FIG. 4B, the processing device 140B may include an acquisition module 406, a model generation module 408, and a determination module 410.

The acquisition module 406 may be configured to obtain data used to train a preliminary artifact correction model. For example, the acquisition module 406 may be configured to obtain a plurality of sample sets. Each sample set may include sample imaging data and corresponding reference sample imaging data. A sample set may include imaging data of two corresponding images with different image qualities. More descriptions regarding the acquisition of the sample sets may be found elsewhere in the present disclosure. See, e.g., operation 602 in FIG. 6, FIG. 10, FIGS. 13, and 14, and relevant descriptions thereof.

The model generation module 408 may be configured to generate the trained artifact correction model by training the preliminary artifact correction model based on the plurality of sample sets. In some embodiments, the trained artifact correction model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the one or more machine learning models may be a supervised learning algorithm, a semi-supervised learning algorithm, an unsupervised learning algorithm, or the like. More descriptions regarding the generation of the trained artifact correction model may be found elsewhere in the present disclosure. See, e.g., operation 604 in FIG. 6, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same acquisition module; that is, the acquisition module 402 and the acquisition module 406 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140.

Figure 5:
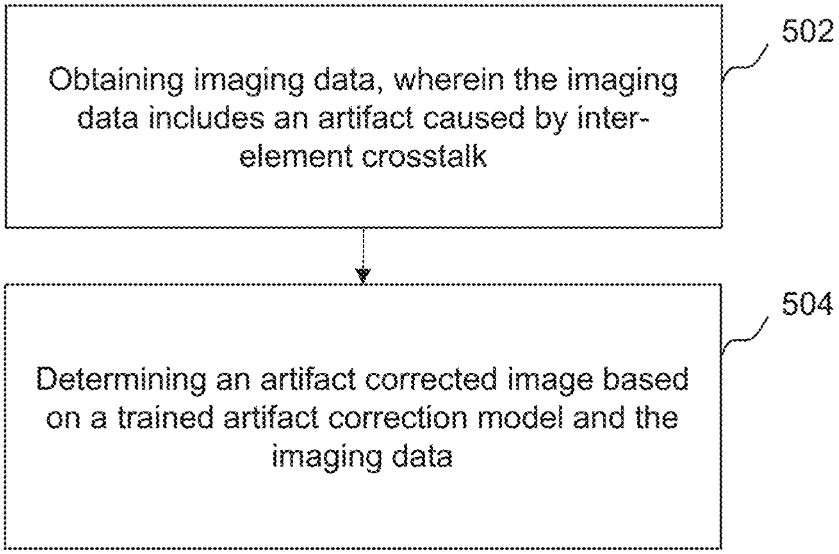
FIG. 5 is a flowchart illustrating an exemplary process for determining an artifact corrected image according to some embodiments of the present disclosure.

FIG. 5 is a flowchart illustrating an exemplary process 500 for determining an artifact corrected image according to some embodiments of the present disclosure. In some embodiments, the process 500 may be implemented in the imaging system 100 illustrated in FIG. 1. For example, the process 500 may be stored in a storage (e.g., the storage device 150, the storage device 220, the storage 390) as a form of instructions, and invoked and/or executed by the processing device 140A (e.g., the processor 210 of the computing device 200 as illustrated in FIG. 2, the CPU 340 of the mobile device 300 as illustrated in FIG. 3, and/or one or more modules as illustrated in FIG. 4A). The operations of the illustrated process presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 502, the processing device 140A (e.g., the acquisition module 402) may obtain imaging data. The imaging data may be acquired by the medical imaging device 111 that includes the detector 113.

In some embodiments, the imaging data may include elements arranged in an array of an array dimension. In some embodiments, the array dimension of the array of the elements may equal the array dimension of the detector unit array of the detector 113 that acquires the imaging data. For example, the detector 113 includes detector units arranged in the detector unit array of the array dimension of 3×4; accordingly, the imaging data obtained from the detector 113 includes elements that are also arranged in the array of the same array dimension of 3×4.

In some embodiments, the imaging data may include an artifact caused by inter-element crosstalk (also referred to as a crosstalk artifact). As used herein, an artifact included in imaging data corresponds to an artifact in an image generated by image reconstruction based on the imaging data. An inter-element crosstalk refers to a phenomenon that photons falling on a specific detector unit of the detector 113 are "falsely" sensed by one or more neighboring detector units around the specific detector unit. Thus, an element (e.g., a detected value, a pixel value, a voxel value, etc.) of the imaging data obtained from the detector 113 may be affected by a result of inter-element crosstalk caused by one or more neighboring detector units. In some embodiments, a shape of the artifact caused by inter-element crosstalk may relate to locations where detector units involved in the inter-element crosstalk are located in the detector unit array. Crosstalk artifacts generated by detector units of different locations may have different shapes in the images. Merely by way of example, an artifact caused by inter-element crosstalk may have the shape of a ring, an arc, a strip, or the like, or any combination thereof.

In some embodiments, the imaging data may include an image (e.g., an original image, a processed image of the original image), projection data (e.g., raw image data), or the like, or a combination thereof. In some embodiments, the imaging data may be obtained from an imaging device (e.g., the imaging device 110, the detector 113). For example, the medical imaging device 111, such as a CT device, an MRI device, an X-ray device, a PET device, a PET-CT device, a PET-MR device, or the like, may be directed to scan a subject (e.g., the chest of the subject) to generate the imaging data. In some embodiments, the imaging data may be previously generated and stored in a storage device (e.g., the storage device 150, the storage device 220, the storage 390, or an external source (e.g., a picture archiving and communication system)). The processing device 140A may retrieve the imaging data directly from the storage device.

In 504, the processing device 140A (e.g., the determination module 404) may determine an artifact corrected image based on a trained artifact correction model and the imaging data.

In some embodiments, the trained artifact correction model may be a process or an algorithm for correcting the crosstalk artifacts in the original image. In some embodiments, the trained artifact correction model may include a Deep Neural Network (DNN) model, a Convolutional Neural Network (CNN) model, a Recurrent Neural Network (RNN) model, a Feature Pyramid Network (FPN) model, a Generative Adversarial Network (GAN) model, a CycleGAN model, a pix2pix model, or the like, or any combination thereof.

In some embodiments, the trained artifact correction model may be associated with the array dimension of the array. For example, the trained artifact correction model may be trained using sample sets including sample imaging data and reference sample imaging data. For a sample set, the sample imaging data may include sample elements arranged in a sample array of a sample array dimension, and the reference sample imaging data may include reference sample elements arranged in a reference sample array of a reference sample array dimension. In some embodiments, the sample array dimension and the reference sample array dimension may equal the array dimension of the array of the original image. For example, the imaging data of the original image that is to be processed includes elements arranged in an array of an array dimension of 3×4, the trained artifact correction model that is used to correct crosstalk artifacts in the original image may be trained using sample elements and reference sample elements arranged in an array of the same array dimension of 3×4. Thus, the trained artifact correction model that is used to correct crosstalk artifacts in the original image may be associated with the array dimension of 3×4. In some embodiments, the trained artifact correction model may be not associated with the array dimension of the array. For example, the trained artifact correction model may be trained using sample sets including sample images and reference sample images. The sample array dimensions and/or the reference sample array dimensions of the sample images and reference sample images may be not limited. For example, the sample images may include sample elements arranged in an array of any random array dimension and/or the reference sample images may include reference sample elements arranged in an array of any random array dimension.

In some embodiments, the processing device 140A may obtain the trained artifact correction model from one or more components of the imaging system 100 (e.g., the storage device 150, the terminals(s) 130) or an external source via a network (e.g., the network 120). For example, the trained artifact correction model may be previously trained by a computing device (e.g., the processing device 140B), and stored in a storage device (e.g., the storage device 150, the storage device 220, and/or the storage 390) of the imaging system 100. The processing device 140A may access the storage device and retrieve the trained artifact correction model. In some embodiments, the trained artifact correction model may be generated according to a machine learning algorithm as described elsewhere in this disclosure (e.g., FIG. 4B and the descriptions thereof). More descriptions for the generation of the trained artifact correction model may be found elsewhere in the present disclosure (e.g., FIG. 6 and the descriptions thereof).

In some embodiments, the processing device 140A may determine processed image data based on the trained artifact correction model and the raw image data directly. For example, the processing device 140A may input the raw image data into the trained artifact correction model. The trained artifact correction model may directly output the processed image data. In some embodiments, the processing device 140A may input the raw image data into the trained artifact correction model, and the trained artifact correction model may directly output the artifact corrected image.

In some embodiments, the processing device 140A may obtain a correction coefficient matrix relating to the imaging data. The correction coefficient matrix may include correction coefficients arranged in a matrix of the same array dimension of the imaging data. A correction coefficient may be configured to correct a crosstalk artifact of an element of the imaging data. In some embodiments, each correction coefficient may correspond to each element of the imaging data. For example, a correction coefficient at position (p, q) of the correction coefficient matrix may be used to correct the crosstalk artifact of an element at position (p, q) of the array. In some embodiments, the correction coefficient matrix may be determined based on the trained artifact correction model. For example, the processing device 140B (e.g., the determination module 410) may determine the correction coefficient matrix by inputting a prefilled numerical matrix into the trained artifact correction model, and the output of the trained artifact correction model may be the correction coefficient matrix. In some embodiments, the prefilled numerical matrix may include a plurality of numerical values arranged in a matrix of the same array dimension as that of the imaging data. For example, if the array dimension of the array of the element of the imaging data is m×n, the prefilled numerical matrix may include numerical values arranged in a matrix of m×n. In some embodiments, the numerical values of the prefilled numerical matrix may be determined by an operator or according to a default setting of the imaging system 100. For example, each numerical value of the prefilled numerical matrix may be 1 for simplicity. In some embodiments, the processing device 140B may determine the correction coefficient matrix offline and store the determined correction coefficient matrix in a storage device (e.g., the storage device 150, the storage device 220, the storage 390, or an external source) of the imaging system 100. The processing device 140A may further determine the processed image data based on the correction coefficient matrix and the raw image data. For example, the processing device 140A may obtain the correction coefficient matrix from the storage device and determine the processed image data by performing an algorithm on the correction coefficient matrix and the raw image data (e.g., multiplying the correction coefficient matrix by the raw image data).

In some embodiments, the processing device 140A may determine the artifact corrected image by image reconstruction using the processed image data. In some embodiments, the processing device 140A may determine the artifact corrected image by performing image reconstruction using the processed image data based on one or more reconstruction techniques. For example, the processing device 140A may determine the artifact corrected image by performing image reconstruction using the processed image data based on an iterative reconstruction technique. Exemplary iterative reconstruction techniques may include an algebraic reconstruction technique (ART), a simultaneous iterative reconstruction technique (SIRT), a simultaneous algebraic reconstruction technique (SART), an adaptive statistical iterative reconstruction (ASIR) technique, a model based iterative reconstruction (MBIR) technique, a sinogram affirmed iterative reconstruction (SAFIR) technique, or the like, or any combination thereof. In some embodiments, the processing device 140A may transmit the processed image data to another computing device (e.g., an image processing device of a third party) that determines the artifact corrected image using the processed image data and transmits the determined artifact corrected image back to the processing device 140A.

In some embodiments, the imaging data may be the original image. The processing device 140A may determine the artifact corrected image of the original image based on the trained artifact correction model and the original image directly. For example, the original image may be input into the trained artifact correction model, and the trained artifact correction model may directly output the artifact corrected image. As another example, the processing device 140A may divide the original image into a plurality of sub-images. Each of at least a portion of the plurality of sub-images may include elements arranged in an array of the array dimension of the trained artifact correction model. Each of the plurality of sub-images that includes elements of the array dimension may be input into the trained artifact correction model, and the trained artifact correction model may output an artifact corrected sub-image corresponding to the sub-image. The processing device 140A may determine the artifact corrected image of the original image based on the plurality of artifact corrected sub-images. For example, the plurality of artifact corrected sub-images may be combined to obtain the artifact corrected image. In some embodiments, if there is at least one sub-image whose elements are arranged in an array of a different array dimension than the trained artifact correction mode, the at least one sub-image may be processed for artifact correction by, e.g., a different model associated with a different array dimension than the trained artifact correction model, or left unprocessed and combined with other artifact corrected sub-images to generate the artifact corrected image, or left out from (not combined into) the artifact corrected image. In some embodiments, the trained artifact correction model used for output the artifact corrected image directly and the trained artifact correction model used for output the processed image data directly are different. For example, the trained artifact correction model used for output the artifact corrected image directly may be trained using sample images and reference sample images, and the trained artifact correction model used for output the processed image data directly may be trained using sample raw image data and reference sample raw image data.

It should be noted that the above description regarding the process 500 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional operation to transmit the artifact corrected image to a terminal device (e.g., a terminal 130 of a doctor) for display.

Figure 6:
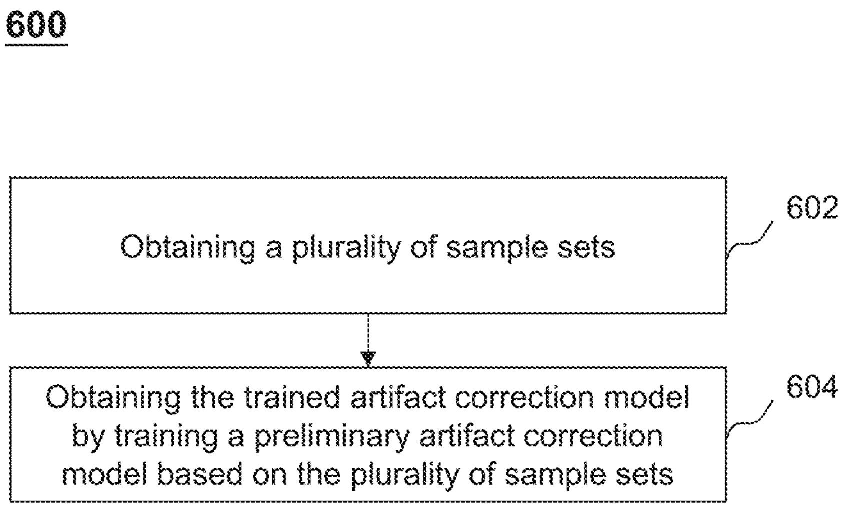
FIG. 6 is a flowchart illustrating an exemplary process for generating a trained artifact correction model according to some embodiments of the present disclosure.

FIG. 6 is a flowchart illustrating an exemplary process 600 for generating a trained artifact correction model according to some embodiments of the present disclosure. In some embodiments, the process 600 may be executed by the imaging system 100. For example, the process 600 may be implemented as a set of instructions (e.g., an application) stored in a storage device (e.g., the storage device 150, the storage device 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 600. In some embodiments, the trained artifact correction model described in connection with operation 504 in FIG. 5 may be obtained according to the process 600. In some embodiments, the process 600 may be performed by another device or system other than the imaging system 100, e.g., a device or system of a vendor or a manufacturer of the trained artifact correction model. For illustration purposes, the implementation of the process 600 by the processing device 140B is described as an example.

In some embodiments, the trained artifact correction model may be trained offline. For example, the trained artifact correction model may be trained and stored in a storage device (e.g., the storage device 150, the storage device 220, the storage 390, etc.) of the imaging system 100. The processing device 140A may access the storage device to retrieve the trained artifact correction model for processing the imaging data of the original image. Alternatively, the trained artifact correction model may be trained in real-time. For example, the processing device 140B may train the trained artifact correction model before using the trained artifact correction model.

In 602, the processing device 140B (e.g., the acquisition module 406) may obtain a plurality of sample sets.

Each sample set may include sample imaging data and corresponding reference sample imaging data. A sample set may include imaging data of two corresponding images with different image qualities. As used herein, two images are considered corresponding to each other if they each include a representation of a same subject. For example, one of the two images that are considered corresponding to each other may be obtained from a sample imaging device, and the other may be processed from the obtained one (e.g., using a process illustrated in FIG. 10 or FIG. 14). As another example, both of the two images that are considered corresponding to each other may be obtained from a same sample imaging device by scanning a same subject, in which one may be acquired by the sample imaging device when it is equipped with an anti-crosstalk apparatus, while the other may be acquired by the same sample imaging device but without any anti-crosstalk apparatus. A sample crosstalk artifact described with reference to FIG. 6 may be same as or similar to the crosstalk artifact described in operation 502; that is, a sample crosstalk artifact in sample imaging data corresponds to an artifact in a sample image generated by image reconstruction based on the sample image data.

In some embodiments, for each sample set, the sample imaging data may include sample elements arranged in a sample array of a sample array dimension. The reference sample imaging data may include reference sample elements arranged in a reference sample array of a reference sample array dimension. The sample array dimension and the reference sample array dimension may equal the array dimension of the original image described in FIG. 5. For example, to generate a trained artifact correction model for correcting crosstalk artifacts of imaging data including elements arranged in an array of an array dimension of 5×6, elements (e.g., the sample elements, the reference sample elements) in the sample imaging data or the reference sample imaging data of each sample set that is used for generating the trained artifact correction model may be arranged in an array (e.g., a sample array, a reference sample array) of the same array dimension of 5×6.

In some embodiments, the processing device 140B may obtain the plurality of sample sets (or a portion thereof) from one or more components of the imaging system 100 (e.g., the storage device 150, the terminals(s) 130) or an external source (e.g., a database of a third-party) via a network (e.g., the network 120). Alternatively, the plurality of sample sets (or a portion thereof) may be acquired by a sample imaging device. In some embodiments, the sample imaging data and/or the reference sample imaging data of a sample set may be acquired by a same sample imaging device.

In some embodiments, for a sample set, one of the sample imaging data and the corresponding reference sample imaging data of the sample set is obtained from a sample imaging device (referred to as the acquired imaging data), and the other of the sample imaging data and the corresponding reference sample imaging data is simulated (referred to as the simulated imaging data) from the acquired imaging data. For example, the sample imaging data in a sample set may be obtained from a sample imaging device and include a sample crosstalk artifact. The corresponding reference sample imaging data in the sample set may be obtained by removing the sample crosstalk artifact from the sample imaging data according to a predetermined algorithm. As another example, the reference sample imaging data in a sample set may be obtained from a sample imaging device installed with an anti-crosstalk apparatus and the reference sample imaging data is considered not including a sample crosstalk artifact. The corresponding sample imaging data in the sample set may be obtained by adding a simulated sample crosstalk artifact to the reference sample imaging data.

In some embodiments, both the sample imaging data and the corresponding reference sample imaging data in a sample set may be obtained from a sample imaging device. For example, the sample imaging data may be obtained from the sample imaging device and the sample imaging data may include a sample crosstalk artifact. The corresponding reference sample imaging data in the sample set may be obtained from the sample imaging device installed with an anti-crosstalk apparatus and the reference sample imaging data does not include the sample crosstalk artifact. Exemplary processes for obtaining a plurality of sample sets may be found elsewhere (e.g., FIGS. 10-14 and the descriptions there) in the present disclosure.

Figure 8:
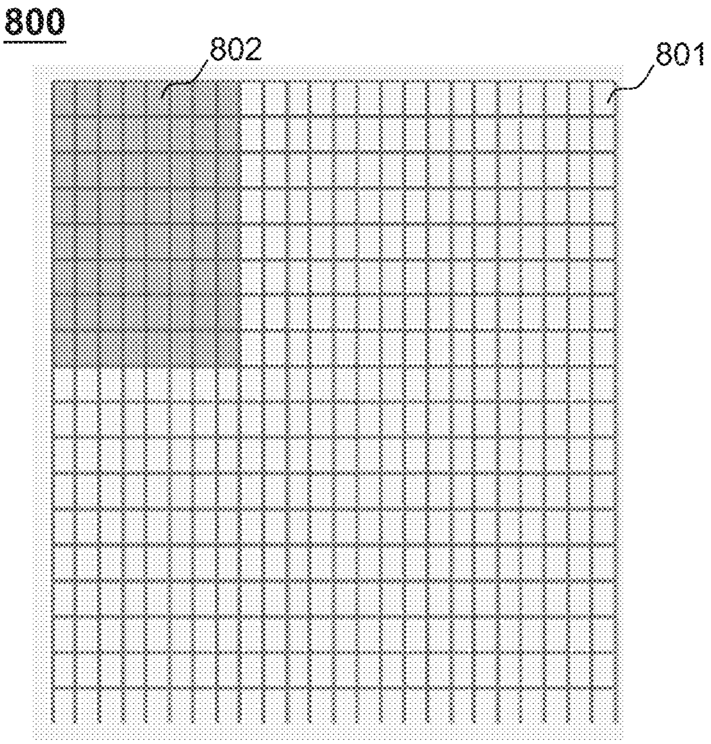
FIG. 8 is a schematic diagram illustrating an exemplary sample detector unit array according to some embodiments of the present disclosure.
Figure 9:
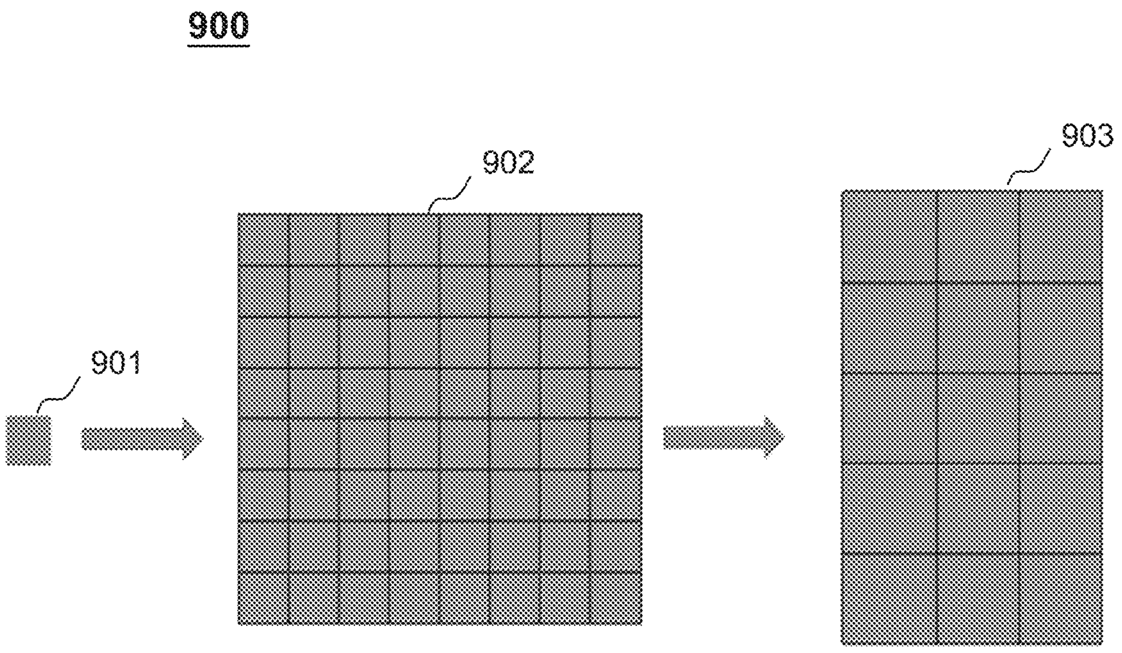
FIG. 9 is a schematic diagram illustrating an exemplary process for forming a sample detector from a sample detector module according to some embodiments of the present disclosure.

In some embodiments, the sample imaging device may include a sample detector. The sample detector may include a sample detector unit array of the array dimension. As used herein, a sample detector unit may refer to a minimum individual component in the sample detector that may detect a signal. FIG. 8 is a schematic diagram illustrating an exemplary sample detector unit array 800 according to some embodiments of the present disclosure. As shown in FIG. 8, a rectangular box represents a sample detector unit (e.g., a sample detector unit 801). In some embodiments, a plurality of sample detector units may form a sub-module. For example, 8*8 sample detector units may form a sub-module 802 as shown in FIG. 8. In some embodiments, the sample detector unit array may be configured as a plurality of sample detector modules. Each sample detector module may include a plurality of sample detector units. FIG. 9 is a schematic diagram illustrating an exemplary process 900 for forming a sample detector from a sample detector module according to some embodiments of the present disclosure. As shown in FIG. 9, a rectangular box represents a sample detector unit (e.g., a sample detector unit 901). A sub-module 902 may include 8*8 sample detector units and a sample detector module 903 may include 5*3 sub-modules 902.

In some embodiments, the sample detector may have the same or similar structure as the detector of the medical imaging device 111 for acquiring the imaging data to be corrected, so that the sample array dimension and the reference sample array dimension may equal the array dimension of the original image described in FIG. 5.

In some embodiments, the sample imaging data and/or the reference sample imaging data may include an image (e.g., a sample original image, a reference sample image), sample projection data (e.g., sample raw image data, reference sample raw image data), or the like, or any combination thereof. In some embodiments, a trained artifact correction model trained using sample original images and reference sample images may be used to process an original image. A trained artifact correction model trained using sample raw image data and reference sample raw image data may be used to process raw image data.

In 604, the processing device 140B (e.g., the model generation module 408) may obtain the trained artifact correction model by training a preliminary artifact correction model based on the plurality of sample sets.

In some embodiments, the preliminary artifact correction model refers to a process, an algorithm, or a model to be trained. The preliminary artifact correction model may be of any type of model (e.g., a machine learning model) as described elsewhere in this disclosure (e.g., FIG. 5 and the relevant descriptions). In some embodiments, the processing device 140B may obtain the preliminary artifact correction model from one or more components of the imaging system 100 (e.g., the storage device 150, the terminals(s) 130) or an external source (e.g., a database of a third-party) via a network (e.g., the network 120).

The preliminary artifact correction model may include a plurality of model parameters. For example, the preliminary artifact correction model may be a CNN model and exemplary model parameters of the preliminary artifact correction model may include the number (or count) of layers, the number (or count) of kernels, a kernel size, a stride, a padding of each convolutional layer, or the like, or any combination thereof. Before training, the model parameters of the preliminary artifact correction model may have their respective initial values. For example, the processing device 140B may initialize parameter values of the model parameters of the preliminary artifact correction model.

In some embodiments, the training of the preliminary artifact correction model may include one or more iterations to iteratively update the model parameters of the preliminary artifact correction model based on the plurality of sample sets until a termination condition is satisfied in a certain iteration. Exemplary termination conditions may be that the value of a loss function obtained in the certain iteration is less than a threshold value, that a certain count of iterations has been performed, that the loss function converges such that the difference of the values of the loss function obtained in a previous iteration and the current iteration is within a threshold value, etc.

Merely by way of example, an updated preliminary artifact correction model generated in a previous iteration may be evaluated in the current iteration. The loss function may be used to measure a discrepancy between a correction result predicted by the updated preliminary artifact correction model in the current iteration and the reference sample imaging data. For example, each sample set may include sample image data (e.g., projection data) and reference sample image data. The sample image data of the sample set may be inputted into the updated preliminary artifact correction model, and the updated preliminary artifact correction model may output a predicted processed sample image data of the sample set. The loss function may be used to measure a difference between the predicted processed sample image data and the reference sample image data of each sample set. As another example, each sample set may include a sample image and a reference sample image. The sample image of the sample set may be inputted into the updated preliminary artifact correction model, and the updated preliminary artifact correction model may output a predicted sample image of the sample set. The loss function may be used to measure a difference between the predicted sample image and the reference sample image of each sample set. Exemplary loss functions may include a normalized exponential function, a focal loss function, a log loss function, a cross-entropy loss, a squared error loss function, a Dice loss, a L1 loss function, a L2 loss function, or the like.

If the termination condition is not satisfied in the current iteration, the processing device 140B may further update the updated preliminary artifact correction model to be used in a next iteration according to, for example, a backpropagation algorithm. If the termination condition is satisfied in the current iteration, the processing device 140B may designate the updated preliminary artifact correction model in the current iteration as the trained artifact correction model.

In some embodiments, elements of the reference sample raw image data may be linear with corresponding elements of the sample raw image data of a same sample set (i.e. a sample set in the data domain). Elements (e.g., pixels, voxels) of the reference sample image may be non-linear with the elements of the corresponding sample original image of a same sample set (i.e. a sample set in the image domain). Thus, a training process using sample sets in the data domain for generating the trained artifact correction model may be simpler than that using sample sets in the image domain for generating the trained artifact correction model. The trained artifact correction model generated using sample sets in the data domain may be more accurate for correcting crosstalk artifacts than that generated using sample sets in the image domain.

It should be noted that the above description regarding the process 600 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the process 600 may be accomplished with one or more additional operations not described and/or without one or more of the operations discussed above. For example, the process 600 may include an additional operation to store the trained artifact correction model in a storage device (e.g., the storage device 150, the storage device 220, and/or the storage 390).

Figure 7:
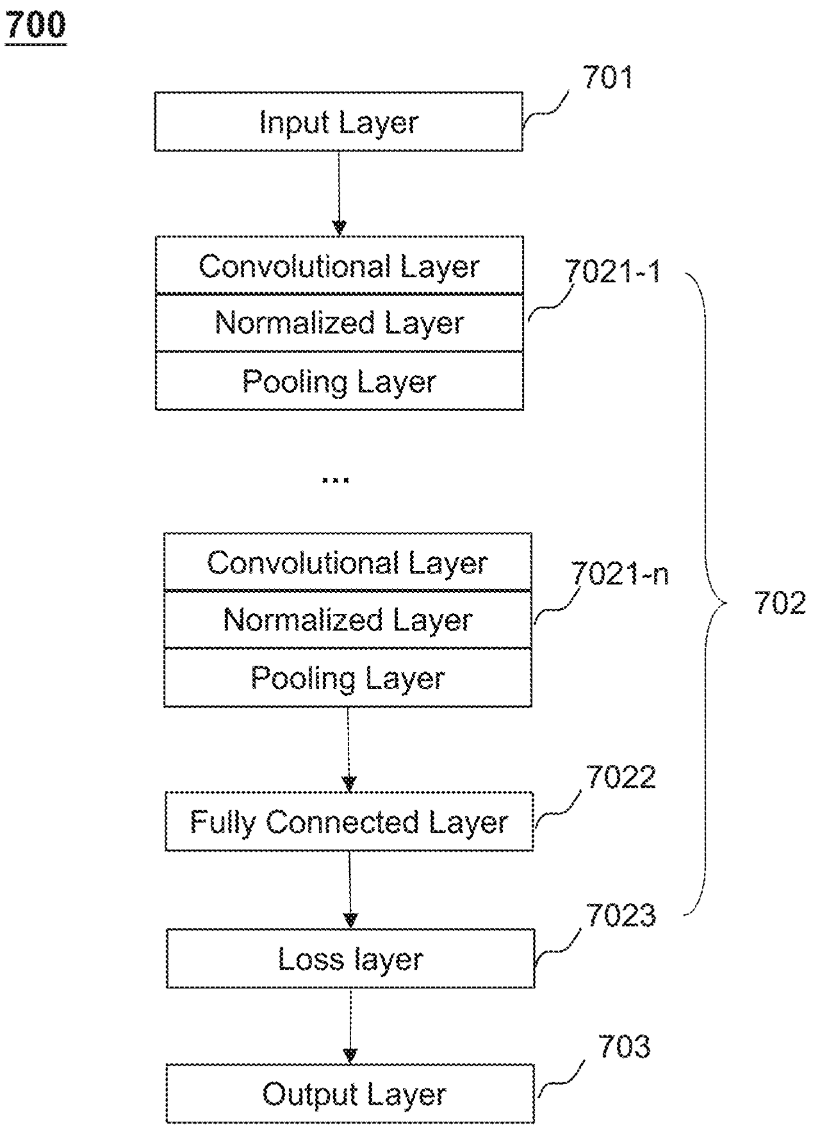
FIG. 7 is a schematic diagram illustrating an exemplary preliminary artifact correction model according to some embodiments of the present disclosure.

FIG. 7 is a schematic diagram illustrating an exemplary preliminary artifact correction model 700 according to some embodiments of the present disclosure. As shown in FIG. 7, the preliminary artifact correction model 700 may include an input layer 701, one or more hidden layers, and an output layer 703. In some embodiments, the layers of the preliminary artifact correction model 700 may be connected in a feed-forward fashion, and an output of an $i^{th}$ layer may be provided as an input to an $(i+1)^{th}$ layer. Alternatively or additionally, an output of the $(i+1)^{th}$ layer may be propagated back to the $i^{th}$ layer according to a chain rule.

In some embodiments, in the preliminary artifact correction model 700, the input layer 701 may be configured to receive an input of the preliminary artifact correction model 700 (e.g., the sample imaging data as described in connection with operation 602 in FIG. 6). Each hidden layer may perform a specific function including, e.g., convolution, pooling, normalization, matrix multiplication, non-linear activation, or the like. The output layer 703 may receive an input from the preceding layer and apply one or more transformations to the received input to generate a processing result of the preliminary artifact correction model 700 (e.g., a predicted processed sample image data or a predicted processed sample image output by the preliminary artifact correction model 700 as described in connection with operation 604 in FIG. 6).

For illustration purposes, exemplary hidden layers 702 may include a plurality of intermediate layer groups 7021-1, . . . , 7021-*n*, a fully connected layer 7022, and a loss layer 7023. An intermediate layer group may include sequentially connected layers including a convolutional layer, a batch normalization layer, and a pooling layer. an each intermediate layer group, the output of the convolutional layer may be processed by the batch normalization layer and the pooling layer, and fed into the convolutional layer of another intermediate layer group. A convolutional layer may be used to extract and/or map feature information of the sample image data. Exemplary feature information may include a low-level feature information (e.g., an edge feature, a textural feature), a high-level feature information, or a complicated feature. A batch normalization layer may be configured to receive and normalize an output of the convolutional layer (e.g., feature maps). The data normalization performed by the batch normalization layer may accelerate the convergence of the preliminary artifact correction model and improve the stability of the preliminary artifact correction model during the training process. For example, the batch normalization layer may force the distribution of an input value of an neuron in each layer of the preliminary artifact correction model 700 to a standard normal distribution with a mean value of 0 and a variance of 1; the batch normalization layer may make the input value of a non-linear function (that represents the preliminary artifact correction model 700) fall into an input sensitive area, so that a small change in the input value may cause a large change in a loss function to avoid the problem of gradient disappearance in low layers of the preliminary artifact correction model 700. A large gradient may result in a high convergence speed in the training of the preliminary artifact correction model 700. Each pooling layer may be used to sample the output of the batch normalization layer, so as to reduce the computational load of data processing and accelerate the data processing.

The fully connected layer 7022 may be connected to the pooling layer of the intermediate layer group 7021-*n*. The fully connected layer 7022 may be used to perform refitting operations to reduce the loss of the feature information.

The loss layer 7023 may be used to assess a loss function based on a correction result predicted by the preliminary artifact correction model and the corresponding reference sample imaging data. The loss function may be used to measure a discrepancy between the correcting result output by the updated preliminary artifact correction model and the reference sample imaging data. More descriptions for the loss function may be found elsewhere in the present disclosure. See, e.g., operation 604 in FIG. 6 and relevant descriptions thereof. It should be noted that the preliminary artifact correction model 700 described in FIG. 7 is merely provided for illustration purposes, and not intended to limit the scope of the present disclosure. A preliminary artifact correction model having any other structures may be used for generating the trained artifact correction model.

Figure 10:
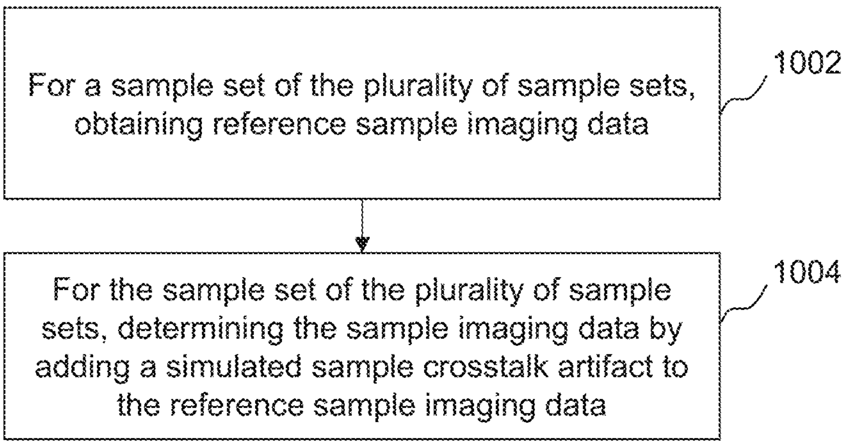
FIG. 10 is a flowchart illustrating an exemplary process for obtaining a plurality of sample sets according to some embodiments of the present disclosure.

FIG. 10 is a flowchart illustrating an exemplary process 1000 for obtaining a plurality of sample sets according to some embodiments of the present disclosure. In some embodiments, one or more operations of the process 1000 may be performed to achieve at least part of operation 602 as described in connection with FIG. 6. In some embodiments, the process 1000 may be executed by the imaging system 100. For example, the process 1000 may be implemented as a set of instructions (e.g., an application) stored in a storage device (e.g., the storage device 150, the storage device 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 1000. In some embodiments, the process 1000 may be performed by another device or system other than the imaging system 100, e.g., a device or system of a vendor or a manufacturer of the trained artifact correction model. For illustration purposes, the implementation of the process 1000 by the processing device 140B is described as an example.

In 1002, for a sample set of the plurality of sample sets, the processing device 140B (e.g., the acquisition module 406) may obtain reference sample imaging data.

As described in connection with operation 602, the reference sample imaging data is considered not including a sample crosstalk artifact. In some embodiments, whether the reference sample imaging data include the sample crosstalk artifact may be determined or confirmed by the processing device 140B or a user (e.g., a doctor). In some embodiments, the reference sample imaging data may be obtained from a sample imaging device installed with an anti-crosstalk apparatus, and stored in a storage device (e.g., the storage device 150, the storage device 220, the storage 390, or an external source (e.g., a picture archiving and communication system)). The processing device 140B may retrieve the reference sample imaging data directly from the storage device. In some embodiments, installing the anti-crosstalk apparatus may include applying an anti-crosstalk material onto the sample detector unit array of the sample detector of the sample imaging device, or installing an anti-crosstalk apparatus (e.g., arranging an isolation layer, coating a reflective layer on scintillation crystals of the sample detector, cutting the scintillation crystals of the sample detector, etc.) for each of at least some sample detector units of the sample detector of the sample imaging device.

In 1004, for the sample set of the plurality of sample sets, the processing device 140B (e.g., the acquisition module 406) may determine the sample imaging data by adding a simulated sample crosstalk artifact to the reference sample imaging data.

In some embodiments, the processing device 140B may identify a plurality of reference elements from the reference sample imaging data. In some embodiments, the reference sample imaging data may be reference sample projection data (e.g., reference sample raw image data) or a reference sample image of a sample subject. A reference element of the reference sample imaging data may be a value (or referred to as reference raw image data) detected by a sample detector unit that is located at a sample position of a sample detector unit array, or a value (e.g., a pixel value, a voxel value, a gray value, a pixel intensity, a voxel intensity, etc.) of a pixel or a voxel at a position corresponding to a physical position of the sample subject. For each of the plurality of reference elements with respect to a simulated sample element, the processing device 140B may determine a crosstalk coefficient representing a degree of a simulated sample crosstalk between the corresponding sample element and at least one neighboring sample element. As used herein, a crosstalk coefficient of an element (e.g., a simulated element) may describe crosstalk that occurs at a detector unit (e.g., a sample detector unit), a pixel (e.g., a reference sample pixel), or a voxel (e.g., a reference sample voxel) corresponding to the element. A sample element corresponding to a reference element may be generated by simulation based on the reference element and the crosstalk coefficient. By assigning different crosstalk coefficients, a reference element may correspond to multiple sample elements. The value of the crosstalk coefficient may be determined according to an empirical value or a default setting of the imaging system 100, or determined by the processing device 140B according to a rule (e.g., a rule set by a user). For example, the value of the crosstalk coefficient may be a value in a range of −0.08 to 0.08. In some embodiments, a positive value of the crosstalk coefficient for a simulated sample element with respect to a current reference element may indicate that a signal that should be detected by the current reference element is spread to its neighboring reference element(s). A negative value of the crosstalk coefficient for a simulated sample element with respect to a current reference element may indicate that a signal detected by the current reference element include signal(s) that should be detected by its neighboring reference element(s) but is/are spread to the current reference element. A 0 crosstalk coefficient for a simulated sample element with respect to a current reference element may indicate that there is no crosstalk in the simulated sample element. The greater an absolute value of a crosstalk coefficient of a simulated sample element, the more crosstalk occurs between the simulated sample element and the at least one neighboring sample element thereof.

In some embodiments, to determine the crosstalk coefficient representing the degree of crosstalk (with respect to a reference element) with at least one neighboring sample element, the processing device 140B may assign a first coefficient value for each reference element in a first element group of the plurality of reference elements. For each reference element in a second element group of the plurality of reference elements, the processing device 140B may assign a second coefficient value that is different from the first coefficient value. The first coefficient values of different reference elements in the first element group may be the same or different. The second coefficient values of different reference elements in the second element group may be the same or different. In some embodiments, the reference elements in the first element group and the reference elements in the second element group may correspond to the plurality of sample detector modules at different locations of the sample detector that acquires the reference sample imaging data. For example, each reference element in the first element group may correspond to a first sample detector unit that is located in an inner region of a sample detector module of the sample detector; each reference element in the second element group may corresponds to a second sample detector unit that is located in a border region of the sample detector module. As used herein, a border region of a detector module (e.g., a sample detector module) refers to a region at the border of the detector module such that a detector unit (e.g., a sample detector unit) within the border region neighbors a detector unit of a different detector module. As used herein, two detector units are considered neighboring each other if there is no other detector unit in between. In some embodiments, two neighboring detector units may be spaced by a gap in between. As used herein, an inner region of a detector module (e.g., a sample detector module) refers to a region of the detector module that is not a border region and is instead inside a region of the detector module defined or confined by the border region. In some embodiments, the first coefficient value corresponding to a first sample detector unit that is located in the inner region of the sample detector module may be different from the second coefficient value correspond to a second sample detector unit that is located in the border region of the sample detector module. For example, an inter-element crosstalk may be restrained (e.g., the second coefficient value may be 0) in the border region of the sample detector module.

Figure 11A:
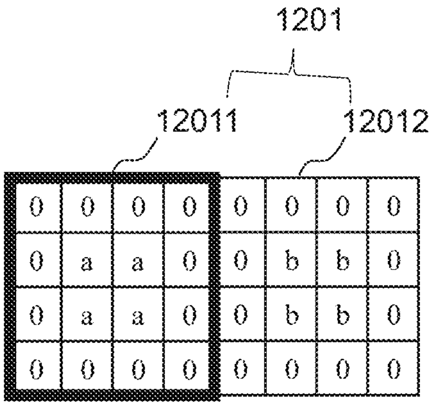
FIG. 11A is a schematic diagram illustrating exemplary coefficient values of reference elements of a sample detector according to some embodiments of the present disclosure.

In some embodiment, the first coefficient values corresponding to first sample detector units in different sample detector modules of a sample detector may be the same or different. For example, FIG. 11A is a schematic diagram illustrating exemplary coefficient values with respect to reference elements of a sample detector 1201 according to some embodiments of the present disclosure. As shown in FIG. 11A, the sample detector 1201 includes a sample detector module 12011 and a sample detector module 12012. The processing device 140B may assign the first coefficient value corresponding to each first sample detector unit and the second coefficient value corresponding to each second sample detector unit in the sample detector module 12011 as a (e.g., −0.02) and 0, respectively. The processing device 140B may assign the first coefficient value corresponding to each first sample detector unit and the second coefficient value corresponding to each first sample detector unit in the sample detector module 12012 as b (e.g., 0.03) and 0, respectively. In some embodiments, the first coefficient values and second coefficient values at the same position (with respect to same reference element of sample detector modules) in different sample sets may be the same or different such that multiple simulated sample imaging data or sample images may be generated based on a same reference imaging data or reference image.

Figure 11B:
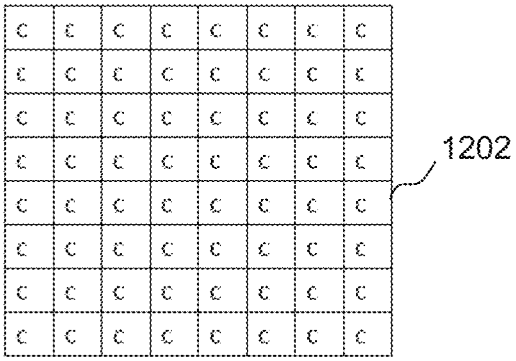
FIG. 11B is a schematic diagram illustrating exemplary coefficient values of reference elements of a sample detector according to some embodiments of the present disclosure.

In some embodiments, the processing device 140B may assign a third coefficient value for each of the plurality of reference elements. For example, FIG. 11B is a schematic diagram illustrating exemplary coefficient values of reference elements of a sample detector 1202 according to some embodiments of the present disclosure. As shown in FIG. 11B, the processing device 140B may assign the coefficient value of each reference element in the sample detector 1202 as c (e.g., 0.04). In some embodiments, the third coefficient values of different sample sets may be the same or different.

In some embodiments, the processing device 140B may assign a random coefficient value for each of the plurality of reference elements. The random coefficient value may be within a range defined by a first coefficient threshold and a second coefficient threshold. In some embodiments, a mean value of the first coefficient threshold and the second coefficient threshold may be predetermined and stored in a storage device (e.g., the storage device 150, the storage device 220, and/or the storage 390). In some embodiments, the first coefficient threshold and the second coefficient threshold may each define a maximum value and a minimum value of crosstalk coefficients that have ever occurred in experimental images or experimental image data. The experimental images or experimental image data may have experimental element in an array of the same reference sample array dimension. The value of the first coefficient threshold or the second coefficient threshold may be determined according to an empirical value or a default setting of the imaging system 100, or determined by the processing device 140B according to a rule (e.g., a rule set by a user).

Figure 11C:
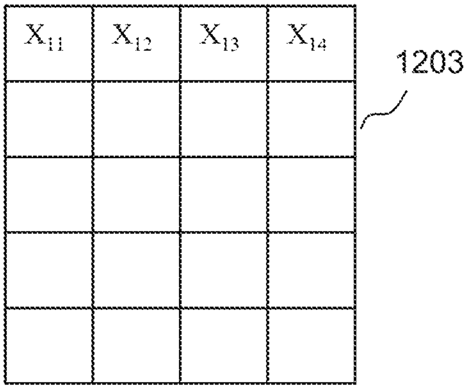
FIG. 11C is a schematic diagram illustrating exemplary coefficient values of reference elements of a sample detector according to some embodiments of the present disclosure.

FIG. 11C is a schematic diagram illustrating exemplary coefficient values of reference elements of a sample detector 1203 according to some embodiments of the present disclosure. As shown in FIG. 11C, the processing device 140B may assign a random coefficient value for each reference element in the sample detector 1203. The random coefficient value may be determined based on the first coefficient threshold and the second coefficient threshold described above. For example, the random coefficient value may be within a range of −0.08 to 0.08, −0.08-0.07, −0.07 to 0.07, etc.

Figure 12:
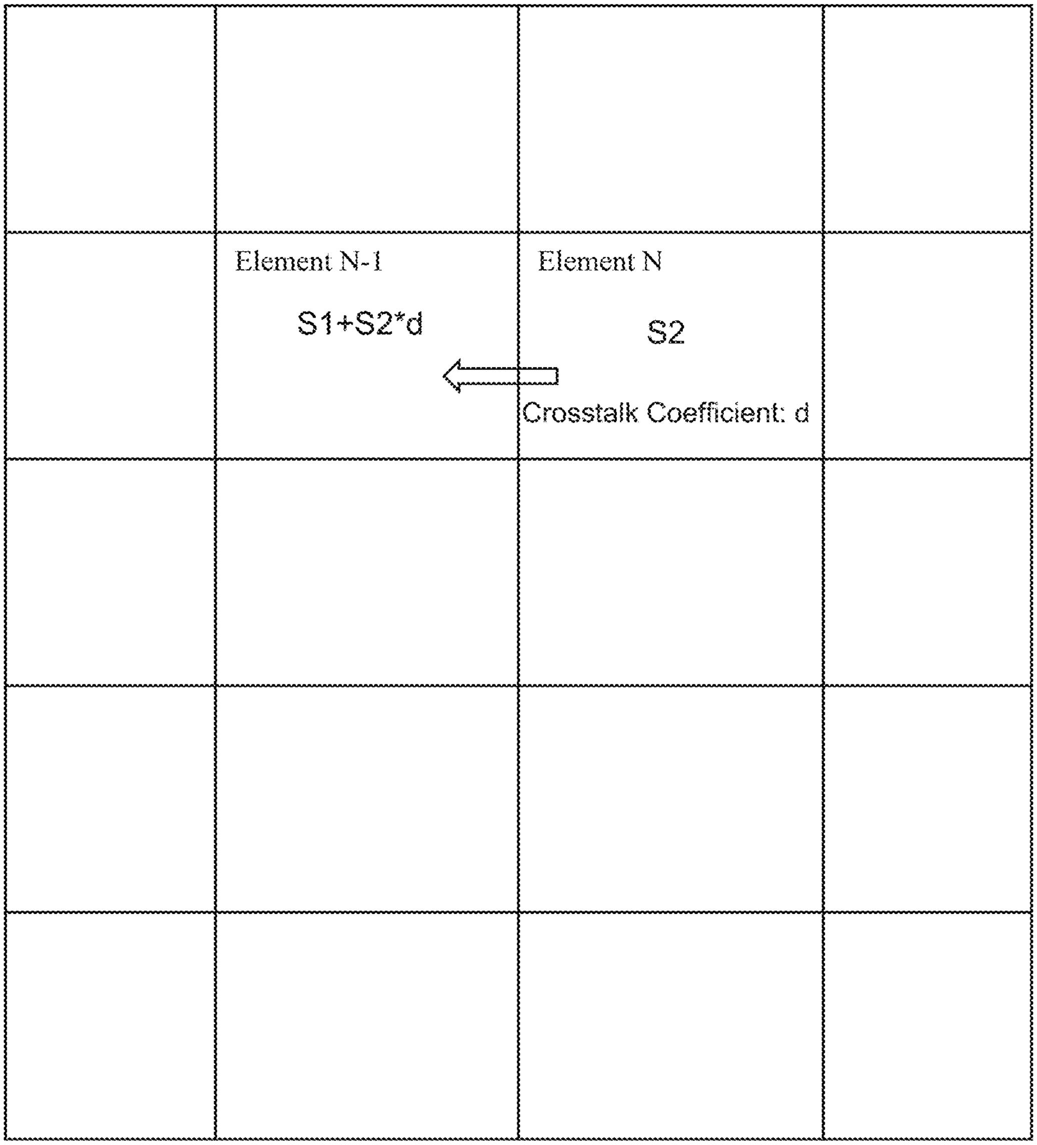
FIG. 12 includes a schematic diagram illustrating an exemplary inter-element crosstalk according to some embodiments of the present disclosure.

In some embodiments, the processing device 140B may determine sample elements based on the crosstalk coefficients of the plurality of reference elements and the reference sample imaging data. For example, for each reference element in the sample reference imaging data, the processing device 140B may determine a sample element corresponding to the reference element based on the reference element and the crosstalk coefficient of the reference element. For example, the processing device 140B may determine a value (e.g., a pixel value, a voxel value) of the sample element corresponding to the reference element by adding a simulated crosstalk artifact. Merely by way of example, the magnitude of the simulated crosstalk artifact may equal the product of a value of a neighboring reference element of the reference element and the crosstalk coefficient of the reference element. See, e.g., FIG. 12 that includes a schematic diagram illustrating an exemplary inter-element crosstalk according to some embodiments of the present disclosure. As shown in FIG. 12, a value (e.g., a pixel value, a voxel value) of a reference element N is S2, and a value of a reference element (N−1) next to the reference element N is S1. If the signal of the reference element N only spreads to the reference element (N−1) and the crosstalk coefficient of the reference element N is d, the processing device 140B may determine a value of the sample element (N−1) as (S1+S2*d). In some embodiments, the processing device 140B may determine the sample imaging data by arranging each determined sample element corresponding to the relative position of each reference element in an array of the same reference sample array dimension. In some embodiments, if the reference sample imaging data is a reference sample image, the processing device 140B may reconstruct the sample imaging data (e.g., the sample projection data) to obtain the reference sample image.

In some embodiments, the processing device 140B may determine different sample imaging data for different sample sets according to assigning different coefficient values (e.g., different first coefficient values, different second coefficient values, different third coefficient values) of the crosstalk coefficient for a same reference element. Training the artifact correction model using a large amount of sample set may improve the accuracy of the trained artifact correction model for correcting crosstalk artifacts.

It should be noted that the above description regarding the process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the process 1000 may be accomplished with one or more additional operations not described and/or without one or more of the operations discussed above. For example, the process 1000 may include an additional operation to store the sample sets in a storage device (e.g., the storage device 150, the storage device 220, and/or the storage 390).

Figure 13:
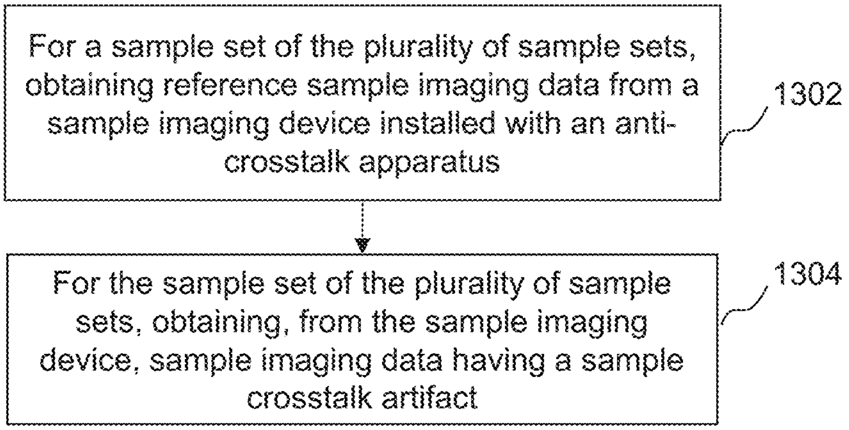
FIG. 13 is a flowchart illustrating an exemplary process for obtaining a plurality of sample sets according to some embodiments of the present disclosure.

FIG. 13 is a flowchart illustrating an exemplary process 1300 for obtaining a plurality of sample sets according to some embodiments of the present disclosure. In some embodiments, one or more operations of the process 1300 may be performed to achieve at least part of operation 602 as described in connection with FIG. 6. In some embodiments, the process 1300 may be executed by the imaging system 100. For example, the process 1300 may be implemented as a set of instructions (e.g., an application) stored in a storage device (e.g., the storage device 150, the storage device 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 1300. In some embodiments, the process 1300 may be performed by another device or system other than the imaging system 100, e.g., a device or system of a vendor or a manufacturer of the trained artifact correction model. For illustration purposes, the implementation of the process 1300 by the processing device 140B is described as an example.

In 1302, for a sample set of the plurality of sample sets, the processing device 140B (e.g., the acquisition module 406) may obtain reference sample imaging data from a sample imaging device installed with an anti-crosstalk apparatus.

As described in connection with operation 602, the reference sample imaging data is considered not including a sample crosstalk artifact. An anti-crosstalk apparatus may effectively reduce or eliminate inter-element crosstalk. In some embodiment, the sample imaging device installed with an anti-crosstalk apparatus may refer to using anti-crosstalk materials on the sample imaging device. In some embodiments, the anti-crosstalk apparatus may include a plurality of anti-crosstalk units (e.g., an isolation layer, a reflective layer, etc.). Each anti-crosstalk unit may be installed on a sample detector unit of the sample imaging device.

In some embodiments, the sample imaging device may be the same as or similar to the sample imaging device described in connection with operation 602 in FIG. 6. In some embodiments, the reference sample imaging data may be acquired by the sample imaging device installed with an anti-crosstalk apparatus and stored in a storage device (e.g., the storage device 150, the storage device 220, the storage 390, or an external source (e.g., a picture archiving and communication system)). The processing device 140B may retrieve the reference sample imaging data from the storage device.

In 1304, for the sample set of the plurality of sample sets, the processing device 140B (e.g., the acquisition module 406) may obtain, from the sample imaging device, sample imaging data having a sample crosstalk artifact.

The sample imaging data is considered including a sample crosstalk artifact. In some embodiments, the sample imaging device for obtaining the sample imaging data may have same components except for the anti-crosstalk apparatus under same operating conditions (e.g., using same operating parameters). The sample imaging data and the reference sample imaging data may be obtained by scanning a same object. In some embodiments, the sample imaging data may be acquired by the sample imaging device and stored in a storage device (e.g., the storage device 150, the storage device 220, the storage 390, or an external source (e.g., a picture archiving and communication system)). The processing device 140B may retrieve the sample imaging data directly from the storage device.

It should be noted that the above description regarding the process 1300 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the process 1300 may be accomplished with one or more additional operations not described and/or without one or more of the operations discussed above. For example, the process 1300 may include an additional operation to store the sample sets in a storage device (e.g., the storage device 150, the storage device 220, and/or the storage 390).

Figure 14:
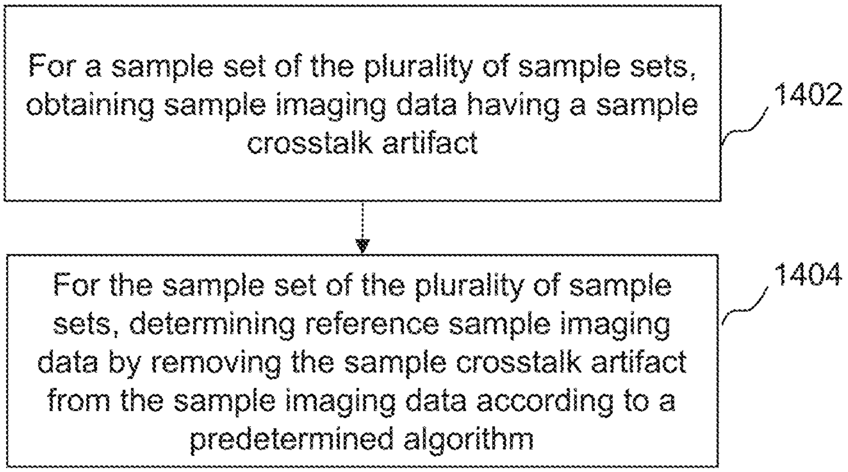
FIG. 14 is a flowchart illustrating an exemplary process for obtaining a plurality of sample sets according to some embodiments of the present disclosure.

FIG. 14 is a flowchart illustrating an exemplary process for obtaining a plurality of sample sets according to some embodiments of the present disclosure. In some embodiments, one or more operations of the process 1400 may be performed to achieve at least part of operation 602 as described in connection with FIG. 6. In some embodiments, the process 1400 may be executed by the imaging system 100. For example, the process 1400 may be implemented as a set of instructions (e.g., an application) stored in a storage device (e.g., the storage device 150, the storage device 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 1400. In some embodiments, the process 1400 may be performed by another device or system other than the imaging system 100, e.g., a device or system of a vendor or a manufacturer of the trained artifact correction model. For illustration purposes, the implementation of the process 1400 by the processing device 140B is described as an example.

In 1402, for a sample set of the plurality of sample sets, the processing device 140B (e.g., the acquisition module 406) may obtain sample imaging data having a sample crosstalk artifact.

In some embodiments, the sample imaging data may be obtained in a similar manner as the sample imaging data or imaging data as described elsewhere (e.g., FIG. 5 and FIG. 13 and the descriptions thereof) in the present disclosure. For example, the sample imaging data may be obtained from a sample imaging device that has no any anti-crosstalk apparatus. In some embodiments, the processing device 140B may obtain the sample imaging data from one or more components of the imaging system 100 (e.g., the storage device 150, the terminals(s) 130) or an external source (e.g., a database of a third-party) via a network (e.g., the network 120).

In 1404, for the sample set of the plurality of sample sets, the processing device 140B (e.g., the acquisition module 406) may determine reference sample imaging data by removing the sample crosstalk artifact from the sample imaging data according to a predetermined algorithm. Exemplary predetermined algorithms may include a Hough transform algorithm, a mean filtering algorithm, a smoothing algorithm, a wavelet transform (WT) algorithm, etc.

In some embodiments, sample sets obtained according to a same process alone (e.g., the process 1000 of FIG. 10, the process 1300 of FIG. 13, the process 1400 of FIG. 14) may be used to train a model in which the model training may converge quickly to provide a trained model with desirable accuracy.

It should be noted that the above description regarding the process 1400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, the process 1400 may be accomplished with one or more additional operations not described and/or without one or more of the operations discussed above. For example, the process 1400 may include an additional operation to store the sample sets in a storage device (e.g., the storage device 150, the storage device 220, and/or the storage 390).

Figure 15:
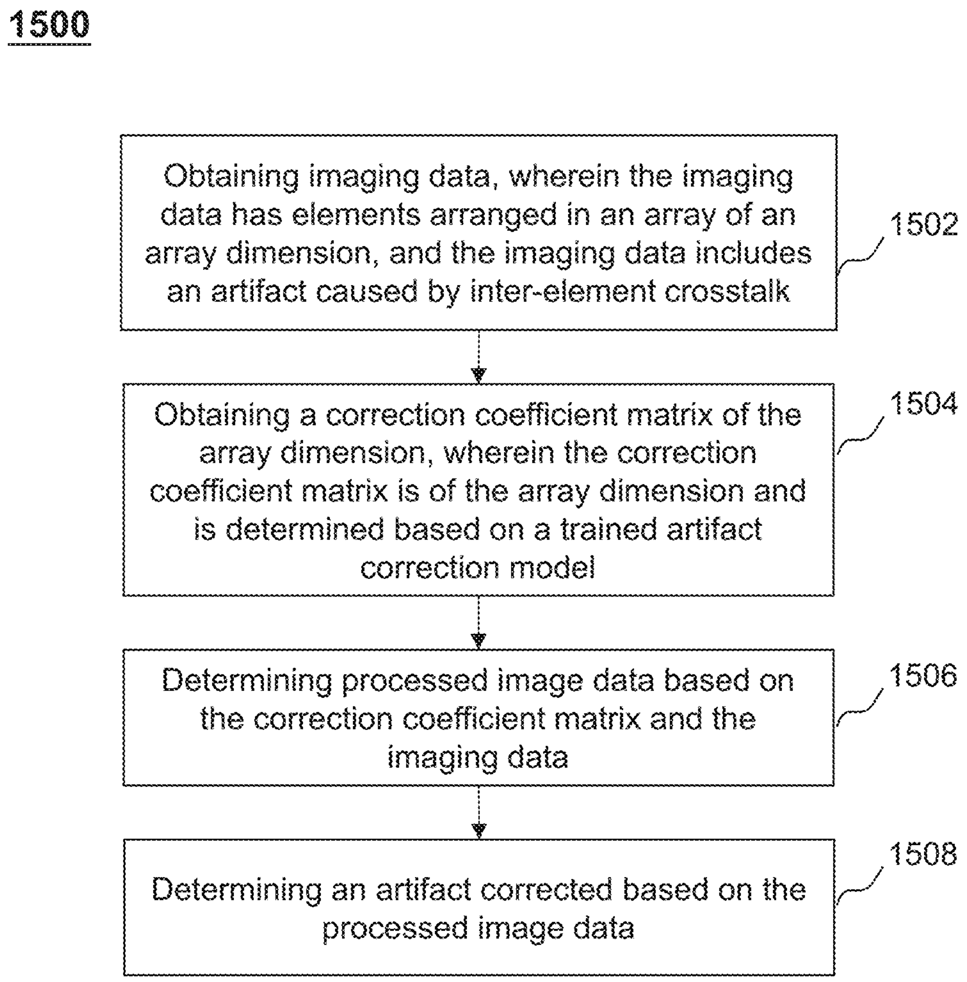
FIG. 15 is a flowchart illustrating an exemplary process for determining an artifact corrected image according to some embodiments of the present disclosure.

FIG. 15 is a flowchart illustrating an exemplary process 1500 for determining an artifact corrected image according to some embodiments of the present disclosure. In some embodiments, the process 1500 may be implemented in the imaging system 100 illustrated in FIG. 1. For example, the process 1500 may be stored in a storage (e.g., the storage device 150, the storage device 220, the storage 390) as a form of instructions, and invoked and/or executed by the processing device 140A (e.g., the processor 210 of the computing device 200 as illustrated in FIG. 2, the CPU 340 of the mobile device 300 as illustrated in FIG. 3, and/or one or more modules as illustrated in FIG. 4A). The operations of the illustrated process presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting.

In 1502, the processing device 140A (e.g., the acquisition module 402) may obtain imaging data. In some embodiments, the imaging data may include elements arranged in an array of an array dimension, and the imaging data may include an artifact caused by inter-element crosstalk.

In some embodiments, the operation 1502 may be similar to or the same as the operation 502 of the process 500 as illustrated in FIG. 5, the descriptions of which are not repeated here.

In 1504, the processing device 140A (e.g., the acquisition module 402) may obtain a correction coefficient matrix of the array dimension.

In some embodiments, the correction coefficient matrix may be obtained offline. For example, the correction coefficient matrix may be obtained and stored in a storage device (e.g., the storage device 150, the storage device 220, the storage 390, etc.) of the imaging system 100. The processing device 140A may access the storage device to retrieve the correction coefficient matrix for processing the imaging data. Alternatively, the correction coefficient matrix may be obtained in real-time. For example, the processing device 140B may determine the correction coefficient matrix before using the correction coefficient matrix.

In some embodiments, the correction coefficient matrix may be of the array dimension. The correction coefficient matrix may be determined based on a trained artifact correction model. Each correction coefficient of the correction coefficient matrix may correspond to an element in the imaging data. In some embodiments, the correction coefficient matrix may be the same as or similar to the correction coefficient matrix described in connection with operation 504 in FIG. 5. The correction coefficient matrix may be determined in a similar manner as that of the correction coefficient matrix described in connection with operation 504 in FIG. 5, and the descriptions thereof are not repeated here.

In 1506, the processing device 140A (e.g., the determination module 404) may determine processed image data based on the correction coefficient matrix and the imaging data.

For example, the processing device 140A may determine the processed image data by performing an algorithm on the correction coefficient matrix and the imaging data (e.g., the raw image data). For example, the processing device 140A may determine the processed image data by multiplying the correction coefficient matrix by the imaging data.

In 1508, the processing device 140A (e.g., the determination module 404) may determine an artifact corrected image based on the processed image data.

In some embodiments, the processing device 140A may determine the artifact corrected image by image reconstruction using the processed image data. In some embodiments, the processing device 140A may reconstruct the artifact corrected image based on one or more reconstruction techniques described in connection with operation 504 in FIG. 5.

In some embodiments, processing imaging data using a correction coefficient matrix which is determined offline and stored in the storage device may be fast since the process for determining the processed image data is an arithmetical operation between the correction coefficient matrix and the imaging data.

Figure 16:
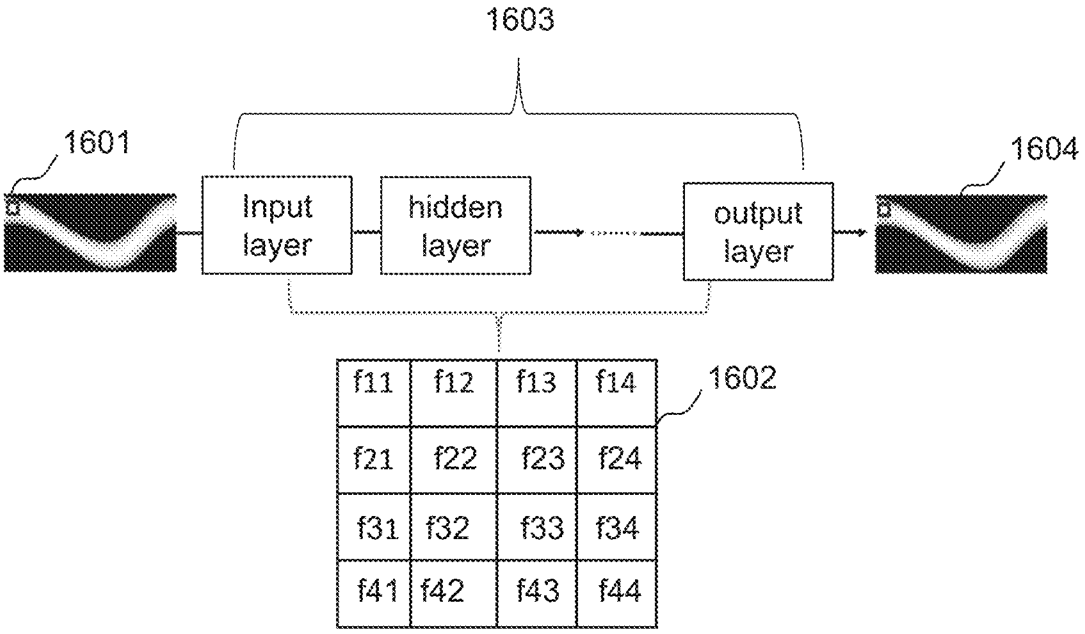
FIG. 16 is a schematic diagram illustrating an exemplary process for generating a correction coefficient matrix according to some embodiments of the present disclosure.

FIG. 16 is a schematic diagram illustrating an exemplary process for generating a correction coefficient matrix according to some embodiments of the present disclosure. As shown in FIG. 16, a preliminary artifact correction model 1603 may be trained using a plurality of sample sets according to, e.g., the process 600, to generate a trained artifact correction model. For example, a sample set may include sample imaging data 1601 and reference sample imaging data 1604. The sample imaging data 1601 may be input into the preliminary artifact correction model 1603 for training to generate a trained artifact correction model, and the reference sample imaging data 1604 may be an expected output determined by the trained artifact correction model. A correction coefficient matrix 1602 may be determined based on the trained artifact correction model. As shown in FIG. 16, the correction coefficient matrix 1602 includes 4*4 correction coefficients (e.g., f11, f12, f21, etc.). The trained artifact correction model and/or the correction coefficient matrix 1602 may be used to process imaging data including elements arranged in an array of an array dimension of 4*4. Each correction coefficient inf the correction coefficient matrix 1602 may be used to correct a crosstalk artifact of an element of the imaging data at a same position of the 4*4 array. For example, a correction coefficient f11 at position (1, 1) of the correction coefficient matrix 1602 may be used to correct crosstalk artifact of an element at position (1, 1) of the array of the imaging data.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A system, comprising:

at least one storage device including a set of instructions; and at least one processor in communication with the at least one storage device, wherein when executing the set of instructions, the at least one processor is directed to cause the system to perform operations including:

obtaining imaging data, wherein the imaging data includes an artifact caused by inter-element crosstalk, and the inter-element crosstalk refers that photons falling on a detector unit of a detector are falsely sensed by one or more neighboring detector units around the detector unit; and determining an artifact corrected image based on a trained artifact correction model and the imaging data, wherein the trained artifact correction model is determined based on a training process, the training process including:

obtaining a plurality of sample sets, wherein each sample set includes sample imaging data and reference sample imaging data, including;

for a sample set of the plurality of sample sets, obtaining the reference sample imaging data;

identifying a plurality of reference elements from the reference sample imaging data;

for each of the plurality of reference elements with respect to a corresponding sample element, determining a crosstalk coefficient representing a degree of crosstalk between the corresponding sample element and at least one neighboring sample element; and determining the sample imaging data based on the crosstalk coefficient of each of the plurality of reference elements and the reference sample imaging data; and obtaining the trained artifact correction model by training a preliminary artifact correction model based on the plurality of sample sets.

2. The system of claim 1, wherein the imaging data is raw image data, the imaging data has elements arranged in an array of an array dimension, and the trained artifact correction model is associated with the array dimension of the array.

3. The system of claim 2, wherein the determining the artifact corrected image based on the trained artifact correction model and the imaging data includes:

determining processed image data based on the trained artifact correction model and the raw image data; and determining the artifact corrected image by image reconstruction using the processed image data.

4. The system of claim 3, wherein the determining the processed image data based on the trained artifact correction model and the raw image data includes:

obtaining the processed image data by inputting the raw image data into the trained artifact correction model.

5. The system of claim 3, wherein the determining the processed image data based on the trained artifact correction model and the raw image data includes:

determining a correction coefficient matrix based on the trained artifact correction model; and determining the processed image data based on the correction coefficient matrix and the raw image data.

6. The system of claim 1, wherein the imaging data is an original image, and the determining the artifact corrected image of the original image based on the trained artifact correction model and the imaging data includes:

obtaining the artifact corrected image by inputting the original image into the trained artifact correction model.

7. The system of claim 1, wherein for each sample set, the sample imaging data includes sample elements arranged in a sample array of a sample array dimension, the reference sample imaging data includes reference sample elements arranged in a reference sample array of a reference sample array dimension, and the sample array dimension and the reference sample array dimension equal the array dimension of the original image.

8. The system of claim 7, wherein the sample imaging data or the reference sample imaging data is acquired by a sample imaging device;

the sample imaging device includes a sample detector; and the sample detector includes a sample detector unit array of the array dimension.

9. The system of claim 8, wherein the sample detector unit array is configured as a plurality of sample detector modules.

10. The system of claim 1, wherein for each of the plurality of reference elements with respect to a sample element, determining the crosstalk coefficient representing the degree of crosstalk between the corresponding sample element and at least one neighboring sample element includes:

assigning a random coefficient value for each of the plurality of reference elements, wherein the random coefficient value is within a range defined by a first coefficient threshold and a second coefficient threshold.

11. The system of claim 1, wherein the obtaining the plurality of sample sets includes:

for a sample set of the plurality of sample sets, obtaining, from a sample imaging device installed with an anti-crosstalk apparatus, reference sample imaging data; and obtaining, from the sample imaging device, sample imaging data having a sample crosstalk artifact.

12. The system of claim 1, wherein the obtaining the plurality of sample sets includes:

for a sample set of the plurality of sample sets, obtaining sample imaging data having a sample crosstalk artifact; and determining reference sample imaging data by removing the sample crosstalk artifact from the sample imaging data according to a predetermined algorithm.

13. The system of claim 1, wherein a shape of the artifact caused by the inter-element crosstalk relate to locations where detector units involved in the inter-element crosstalk are located in a detector unit array.

14. The system of claim 1, wherein for each of the plurality of reference elements with respect to a corresponding sample element, determining the crosstalk coefficient representing the degree of crosstalk between the corresponding sample element and at least one neighboring sample element includes:

for each reference element in a first element group of the plurality of reference elements, assigning a first coefficient value; and for each reference element in a second element group of the plurality of reference elements, assigning a second coefficient value that is different from the first coefficient value.

15. A system, comprising:

at least one storage device including a set of instructions; and at least one processor in communication with the at least one storage device, wherein when executing the set of instructions, the at least one processor is directed to cause the system to perform operations including:

obtaining imaging data of an original image, wherein the imaging data has elements arranged in an array of an array dimension, and the imaging data includes an artifact caused by inter-element crosstalk;

obtaining a correction coefficient matrix of the array dimension, wherein the correction coefficient matrix is of the array dimension and is generated by a trained artifact correction model;

determining processed image data based on the correction coefficient matrix and the imaging data; and determining an artifact corrected image of the original image based on the processed image data.

16. A method, the method being implemented on a computing device having at least one storage device and at least one processor, the method comprising:

obtaining imaging data, wherein the imaging data includes an artifact caused by inter-element crosstalk, and the inter-element crosstalk refers that photons falling on a detector unit of a detector are falsely sensed by one or more neighboring detector units around the detector unit; and determining an artifact corrected image based on a trained artifact correction model and the imaging data, wherein the trained artifact correction model is determined based on a training process, the training process including:

obtaining a plurality of sample sets, wherein each sample set includes sample imaging data and reference sample imaging data, including for a sample set of the plurality of sample sets, obtaining the reference sample imaging data;

identifying a plurality of reference elements from the reference sample imaging data;

for each of the plurality of reference elements with respect to a corresponding sample element, determining a crosstalk coefficient representing a degree of crosstalk between the corresponding sample element and at least one neighboring sample element; and determining the sample imaging data based on the crosstalk coefficient of each of the plurality of reference elements and the reference sample imaging data; and obtaining the trained artifact correction model by training a preliminary artifact correction model based on the plurality of sample sets.

* * * * *